(12) United States Patent
Harashima et al.

(10) Patent No.: US 9,686,428 B2
(45) Date of Patent: Jun. 20, 2017

(54) EQUIPMENT TO DETERMINE LINE WIDTH OF CHECK IMAGE AND IMAGE-FORMING APPARATUS USING THE SAME

(71) Applicant: KONICA MINOLTA, INC., Chiyoda-ku, Tokyo (JP)

(72) Inventors: Takashi Harashima, Aichi-ken (JP); Takaaki Kooriya, Tokyo (JP); Katsuyuki Hirata, Aichi-ken (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 15/052,196

(22) Filed: Feb. 24, 2016

(65) Prior Publication Data
US 2016/0255241 A1 Sep. 1, 2016

(30) Foreign Application Priority Data

Feb. 26, 2015 (JP) .................................. 2015-036256
Feb. 26, 2015 (JP) .................................. 2015-036257

(51) Int. Cl.
*H04N 1/00* (2006.01)
*H04N 1/40* (2006.01)
(Continued)

(52) U.S. Cl.
CPC ....... *H04N 1/00334* (2013.01); *G06K 7/0095* (2013.01); *G06K 7/10851* (2013.01); *G06K 7/146* (2013.01); *G06K 7/1413* (2013.01); *G06K 7/1452* (2013.01); *G06K 7/1486* (2013.01); *G06K 9/183* (2013.01); *G06K 9/4604* (2013.01); *G06K 15/00* (2013.01); *G06K 15/1223* (2013.01); *G06K 15/1872* (2013.01); *G06T 5/003* (2013.01); *G06T 7/13* (2017.01);
(Continued)

(58) Field of Classification Search
None
See application file for complete search history.

(56) References Cited

U.S. PATENT DOCUMENTS 4,646,353 A * 2/1987 Tenge ................. G06K 7/10871
235/437
5,311,246 A * 5/1994 Warner ..................... G03C 5/02
355/133
(Continued)

FOREIGN PATENT DOCUMENTS

JP 62120585 A 6/1987
JP 2006209208 A 8/2006
(Continued)

OTHER PUBLICATIONS

JPO Notification of Rejection Reason(s) corresponding to Application No. JP2015-036256; Mailing date of Feb. 7, 2017.

*Primary Examiner* — Scott A Rogers
(74) *Attorney, Agent, or Firm* — Cantor Colburn LLP

(57) ABSTRACT

In image-checking equipment, a detector reads a line-shaped check image formed on a sheet and acquires image data on the check image. A controller calculates an edge blur in a rising edge and a falling edge of the image data, calculates a line width of the check image. The controller refers to a correction table with the measured values of the edge blur and the line width of the check image, and acquires a corrected line width value based on the correction table to obtain the real line width of the check image.

22 Claims, 20 Drawing Sheets

(51) Int. Cl.
*H04N 1/409* (2006.01)
*G06K 15/00* (2006.01)
*G06K 9/18* (2006.01)
*G06K 9/46* (2006.01)
*G06K 7/00* (2006.01)
*G06K 7/10* (2006.01)
*G06K 7/14* (2006.01)
*G06T 5/00* (2006.01)
*G06T 7/00* (2017.01)
*G06K 15/12* (2006.01)
*G06K 15/02* (2006.01)
*G06T 7/13* (2017.01)

(52) U.S. Cl.
CPC . *H04N 1/4092* (2013.01); *G06T 2207/20192* (2013.01); *H04N 1/40037* (2013.01)

(56) References Cited

U.S. PATENT DOCUMENTS

| | | | | |
|---|---|---|---|---|
| 5,514,858 A | * | 5/1996 | Ackley | G06K 7/1486 235/462.16 |
| 5,537,431 A | * | 7/1996 | Chen | G06K 7/1486 235/462.07 |
| 5,564,841 A | * | 10/1996 | Austin | B41J 2/36 347/188 |
| 5,600,574 A | * | 2/1997 | Reitan | H04N 1/00002 702/185 |
| 5,929,420 A | * | 7/1999 | Cai | G06K 7/14 235/462.07 |
| 6,147,767 A | * | 11/2000 | Petteruti | G06K 15/00 358/1.18 |
| 6,189,794 B1 | * | 2/2001 | Iwaguchi | G06K 7/10851 235/462.25 |
| 7,147,161 B2 | * | 12/2006 | He | G06K 7/1452 235/462.06 |
| 7,726,571 B2 | * | 6/2010 | Madej | G06K 7/14 235/462.01 |
| 8,267,322 B2 | * | 9/2012 | Li | G06K 7/10 235/462.1 |
| 8,333,326 B2 | * | 12/2012 | Nakamura | G06K 7/10712 235/462.09 |
| 8,668,149 B2 | * | 3/2014 | Good | G06K 7/10554 235/437 |
| 8,890,917 B2 | * | 11/2014 | Matsuda | G06F 3/1208 347/110 |
| 9,361,672 B2 | * | 6/2016 | Umanskyi | G06T 5/003 |
| 2002/0084330 A1 | * | 7/2002 | Chiu | G06K 7/10 235/462.11 |

FOREIGN PATENT DOCUMENTS

| | | |
|---|---|---|
| JP | 2009194450 A | 8/2009 |
| JP | 2010134958 A | 6/2010 |

\* cited by examiner

FIG. 5

| EDGE BLUR (μm) B1 | | | | | | | |
|---|---|---|---|---|---|---|---|
| 75~80 | 100 | 102 | 104 | 106 | 108 | 110 | 112 |
| 70~75 | 98 | 100 | 102 | 104 | 106 | 108 | 110 |
| 65~70 | 96 | 98 | 100 | 102 | 104 | 106 | 108 |
| 60~65 | 94 | 96 | 98 | 100 | 102 | 104 | 106 |
| 55~60 | 92 | 94 | 96 | 98 | 100 | 102 | 104 |
| 50~55 | 90 | 92 | 94 | 96 | 98 | 100 | 102 |
| 45~50 | 88 | 90 | 92 | 94 | 96 | 98 | 100 |
| | 88~90 | 90~92 | 92~94 | 94~96 | 96~98 | 98~100 | 100~102 |

B2
LINE WIDTH (μm)

TB1

|        | INTENSITY OF LD (µW) | LINE WIDTH (µm) |
|--------|----------------------|-----------------|
| Pt(1)  | 350                  | 176             |
| Pt(2)  | 300                  | 137             |
| Pt(3)  | 250                  | 100             |
| Pt(4)  | 200                  | 65              |

| EDGE BLUR (μm) B1 | | | | | | | |
|---|---|---|---|---|---|---|---|
| 75~80 | 100 | 102 | 104 | 106 | 108 | 110 | 112 |
| 70~75 | 98 | 100 | 102 | 104 | 106 | 108 | 110 |
| 65~70 | 96 | 98 | 100 | 102 | 104 | 106 | 108 |
| 60~65 | 94 | 96 | 98 | 100 | 102 | 104 | 106 |
| 55~60 | 92 | 94 | 96 | 98 | 100 | 102 | 104 |
| 50~55 | 90 | 92 | 94 | 96 | 98 | 100 | 102 |
| 45~50 | 88 | 90 | 92 | 94 | 96 | 98 | 100 |
|  | 88~90 | 90~92 | 92~94 | 94~96 | 96~98 | 98~100 | 100~102 |

B2
LINE WIDTH (μm)

| EDGE BLUR (μm) B1 | | | | | | | |
|---|---|---|---|---|---|---|---|
| 95~100 | 100 | 102 | 104 | 106 | 108 | 110 | 112 |
| 90~95 | 98 | 100 | 102 | 104 | 106 | 108 | 110 |
| 85~90 | 96 | 98 | 100 | 102 | 104 | 106 | 108 |
| 80~85 | 94 | 96 | 98 | 100 | 102 | 104 | 106 |
| 75~80 | 92 | 94 | 96 | 98 | 100 | 102 | 104 |
| 70~75 | 90 | 92 | 94 | 96 | 98 | 100 | 102 |
| 65~70 | 88 | 90 | 92 | 94 | 96 | 98 | 100 |
|  | 88~90 | 90~92 | 92~94 | 94~96 | 96~98 | 98~100 | 100~102 |

B2
LINE WIDTH (μm)

| EDGE BLUR (μm) B1 | 75~80 | 100 | 102 | 104 | 106 | 108 | 110 | 112 |
|---|---|---|---|---|---|---|---|---|
| | 70~75 | 98 | 100 | 102 | 104 | 106 | 108 | 110 |
| | 65~70 | 96 | 98 | 100 | 102 | 104 | 106 | 108 |
| | 60~65 | 94 | 96 | 98 | 100 | 102 | 104 | 106 |
| | 55~60 | 92 | 94 | 96 | 98 | 100 | 102 | 104 |
| | 50~55 | 90 | 92 | 94 | 96 | 98 | 100 | 102 |
| | 45~50 | 88 | 90 | 92 | 94 | 96 | 98 | 100 |
| | | 88~90 | 90~92 | 92~94 | 94~96 | 96~98 | 98~100 | 100~102 |

B2
LINE WIDTH (μm)

| EDGE BLUR (μm) B1 | 90~95 | 100 | 102 | 104 | 106 | 108 | 110 | 112 |
|---|---|---|---|---|---|---|---|---|
| | 85~90 | 98 | 100 | 102 | 104 | 106 | 108 | 110 |
| | 80~85 | 96 | 98 | 100 | 102 | 104 | 106 | 108 |
| | 75~80 | 94 | 96 | 98 | 100 | 102 | 104 | 106 |
| | 70~75 | 92 | 94 | 96 | 98 | 100 | 102 | 104 |
| | 65~70 | 90 | 92 | 94 | 96 | 98 | 100 | 102 |
| | 60~65 | 88 | 90 | 92 | 94 | 96 | 98 | 100 |
| | | 88~90 | 90~92 | 92~94 | 94~96 | 96~98 | 98~100 | 100~102 |

B2
LINE WIDTH (μm)

FIG. 18

|  | Pt(1) | Pt(2) | Pt(3) | Pt(4) |
|---|---|---|---|---|
| LINE WIDTH | 90 μm | 92 μm | 100 μm | 95 μm |
| EDGE BLUR | 80 μm | 72 μm | 40 μm | 60 μm |

| INTENSITY OF LD ($\mu$w) | Pt1(1)—Pt1(4) | | Pt2(1)—Pt2(4) | | Pt3(1)—Pt3(4) | | Pt4(1)—Pt4(4) | | LINE WIDTH ($\mu$w) |
|---|---|---|---|---|---|---|---|---|---|
| | EDGE BLUR | LINE WIDTH | EDGE BLUR | LINE WIDTH | EDGE BLUR | LINE WIDTH | EDGE BLUR | LINE WIDTH | |
| 350 | ... | ... | ... | ... | ... | ... | ... | ... | 176 |
| 300 | ... | ... | ... | ... | ... | ... | ... | ... | 137 |
| 250 | 80 | 90 | 72 | 92 | 40 | 100 | 60 | 95 | 100 |
| 200 | ... | ... | ... | ... | ... | ... | ... | ... | 65 |

|  | INTENSITY OF LD (μW) | LINE WIDTH (μm) |
|---|---|---|
| Pt(1) | 350 | 176 |
| Pt(2) | 300 | 137 |
| Pt(3) | 250 | 100 |
| Pt(4) | 200 | 65 |

EQUIPMENT TO DETERMINE LINE WIDTH OF CHECK IMAGE AND IMAGE-FORMING APPARATUS USING THE SAME

CROSS REFERENCES TO RELATED APPLICATIONS

The present invention claims priority under 35 U.S.C. §119 to Japanese Application No. 2015-036256 filed Feb. 26, 2015, and to Japanese Application No. 2015-036257 filed Feb. 26, 2015, the entire contents of which are incorporated herein by reference.

BACKGROUND OF THE INVENTION

Field of the Invention

The present invention relates to image-checking equipment which optically reads a check image formed on medium to acquire a real line width of the check image, and an image-forming apparatus that uses the same to acquire the real line width of the check image and sets output for image writing according to the acquired real line width.

Description of Related Art

A technology such that a read image is binarized or an image can be correctly recognized in order to determine whether or not the formed image is correctly written has been proposed in an apparatus which optically reads an image formed on medium such as a sheet of paper to acquire a line width.

For example, in an information-reading apparatus which reads one- or two-dimensional information such as bar code, a technology such that it is determined whether or not the read image does not blur and it is determined whether or not a distance from the apparatus to an object to be read is within a range in which a satisfied reading can be performed has been proposed (see, for example, Japanese Patent Application Publication No. 2006-209208).

Further, in a bar-code-reading apparatus, a technology such that by using a specific characteristic such that white and black bars are alternately present and a line width of the white or black bar is an integer multiple of the finest line width, it is determined whether the image is white or black using a predetermined threshold value and then, the line width is recognized has been proposed (see, for example, Japanese Patent Application Publication No. S62-120585).

Additionally, a technology such that an edge of a document is searched has been also proposed (see, for example, Japanese Patent Application Publication No. 2010-134958).

SUMMARY OF THE INVENTION

In a procedure in which a line width of the image is obtained from image data acquired by optically reading a line-shaped image, the line width is acquired by detecting an edge of the line-shaped image and obtaining a distance between the edges. When changing a distance between the image to be read and a reading device, the image data is caused to be made blur so that is difficult to detect the edge accurately in the image data and the line width can be deviated from its correct value.

For example, in a technology such that an image is formed by setting an output of image writing and the line width of the formed image is obtained, so that any relation between the output for image writing and the line width of the image to be formed is acquired, thereby setting the output for image writing in order to form the image with the predetermined line width, when obtaining the line width inaccurately, it is difficult to accurately set any output of the image writing.

In the above-mentioned past technologies, it has been difficult to obtain the line width of the image accurately when changing a distance between the image to be read and an optically reading device.

The present invention addresses the above-described issues. The present invention has an object to provide image-checking equipment which optically reads an image formed on medium to acquire a line width of a check image accurately, and an image-forming apparatus that uses the image-checking equipment to acquire the line width of the check image and sets output for image writing according to the acquired line width.

To achieve at least one of the above-described objects, image-checking equipment contains a detector that optically reads a line-shaped check image formed on medium and acquires image data on the check image, and a controller that calculates an edge blur in a rising edge and a falling edge of the image data acquired by the detector, calculates a line width of the check image and obtains a real line width of the check image according to measured values of the edge blur and the line width of the check image.

According to embodiments of the present invention, it is desired to provide the image-checking equipment wherein a correction table for correcting the calculated line width of the check image is stored, and the real line width of the check image correlates to the edge blur and a measured value of the line width of the check image in the correction table, and the controller refers to the correction table with the measured value of the edge blur and the line width of the check image, and acquires a corrected line width value based on the correction table to obtain the real line width of the check image.

It is further desired to provide an image-forming apparatus contains an image-forming portion that forms an image on medium and forms a line-shaped check image on the medium, a detector that optically reads the check image formed on the medium and acquires image data on the check image, and a controller that calculates an edge blur in a rising edge and a falling edge of the image data acquired by the detector on the line-shaped check image formed on the medium by the image-forming portion, calculates a line width of the check image and obtains a real line width of the check image according to measured values of the edge blur and the line width of the check image.

It is additionally desired to provide the image-forming apparatus wherein a correction table for correcting the calculated line width of the check image is stored, and the real line width of the check image correlates to the edge blur and a measured value of the line width of the check image in the correction table, and the controller refers to the correction table with the measured values of the edge blur and the line width of the check image, and acquires a corrected line width value based on the correction table to obtain the real line width of the check image.

It is still further desired to provide the image-forming apparatus wherein plural correction tables for correcting the calculated line width of the check image are stored, each table corresponding to edge blurs changed according to durability, and the controller selects any one of the correction tables according to the durability.

It is still additionally desired to provide the image-forming apparatus wherein plural correction tables for correcting the calculated line width of the check image are stored, each table corresponding to edge blurs changed according to an ambient environment, and the controller selects any one of the correction tables according to the ambient environment.

It is also desired to provide the image-forming apparatus wherein the controller changes a line-width detection threshold value to obtain the line width of the check image, and upper and lower limit threshold values to obtain the edge blur based on durability, an ambient environment or both of the durability and the ambient environment from the image data acquired by the detector on the line-shaped check image formed on the medium by the image-forming portion.

It is further desired to provide the image-forming apparatus wherein based on the detection result of the line width of the check image, the controller sets output from the image-forming portion that forms the image with the resulted line width.

It is additionally desired to provide the image-forming apparatus wherein the detector is an in-line sensor that detects color information and reflectivity information of the check image formed by the image-forming portion.

It is still further desired to provide the image-forming apparatus wherein the detector is an optical sensor that detects reflectivity information of the check image formed by the image-forming portion.

Other objects and attainments of the present invention will be become apparent to those skilled in the art upon a reading of the following detailed description when taken in conjunction with the drawing.

BRIEF DESCRIPTION OF THE DRAWINGS

FIG. 5 is a table showing an example of a correction table for correcting the line width of the check image;

FIG. 16A is a table showing an example of a correction table for correcting the line width of the check image, to be selected according to the durability;

FIG. 16B is a table showing another example of a correction table for correcting the line width of the check image, to be selected according to the durability;

FIG. 17A is a table showing an example of a correction table for correcting the line width of the check image, to be selected according to the environment;

FIG. 17B is a table showing another example of a correction table for correcting the line width of the check image, to be selected according to the environment;

FIG. 18 is a table showing a detection result of the edge blur and line width of the check image;

DESCRIPTION OF THE PREFERRED EMBODIMENTS

The following will describe embodiments of image-checking equipment and an image-forming apparatus according to the present invention with reference to the drawings. Such description does not limit the technical scope, meaning of terms and the like in Claims.

<First Embodiment of Image-Checking Equipment and Image-Forming Apparatus According to Present Invention>

Figure 1A:
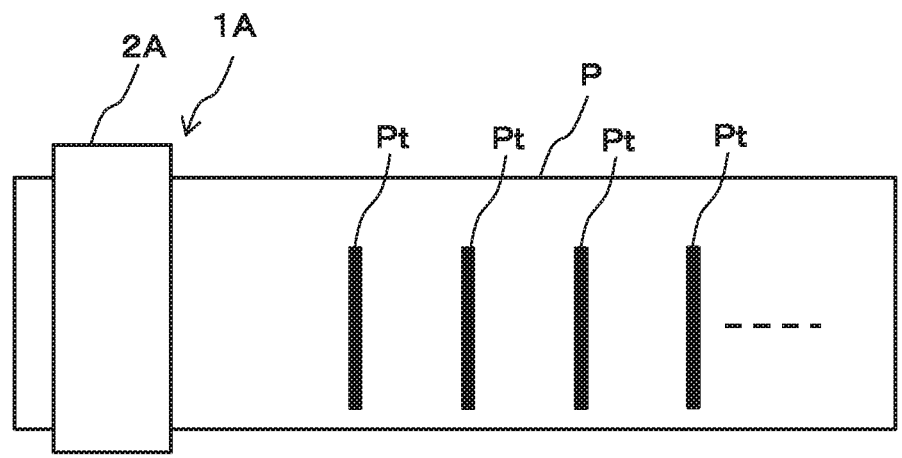
FIG. 1A is a plan view of a first embodiment of image-checking equipment according to the invention showing a configuration example thereof.
Figure 1B:
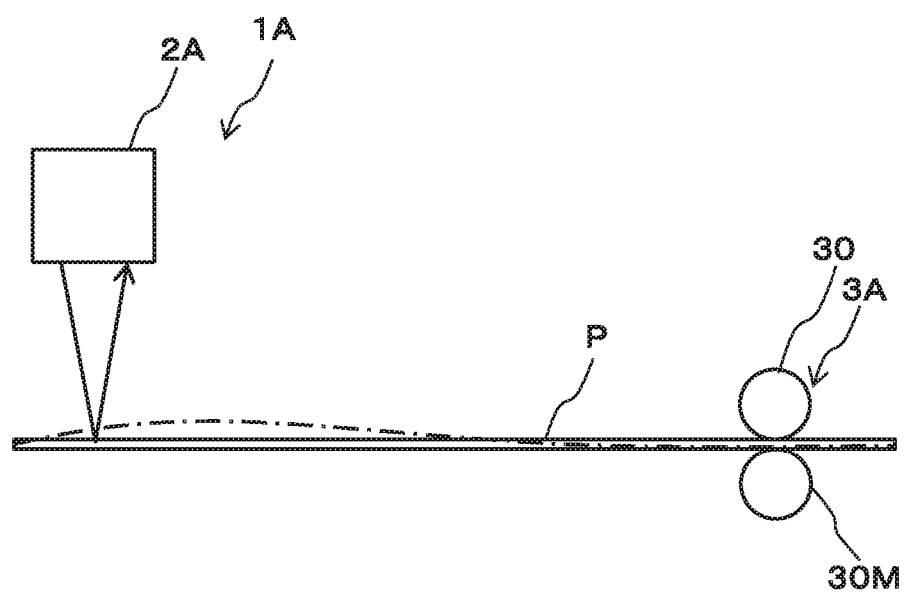
FIG. 1B is a side view of the first embodiment of the image-checking equipment according to the invention showing the configuration example thereof.
Figure 2:
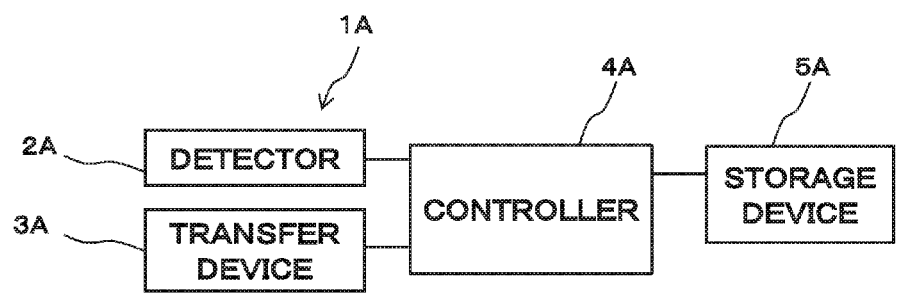
FIG. 2 is a block diagram showing a configuration example of the first embodiment of the image-checking equipment according to the invention.
Figure 3:
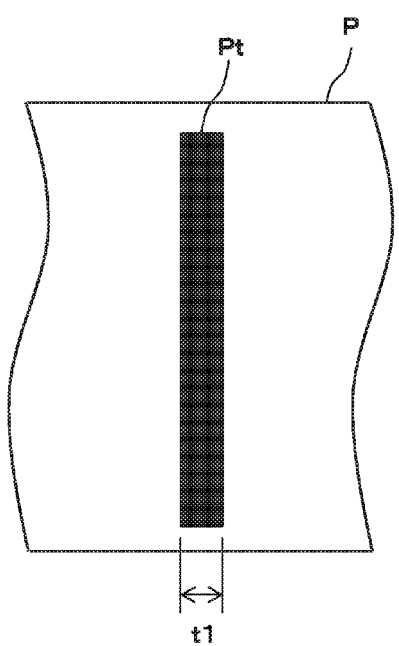
FIG. 3 is an illustration showing an example of a check image.
Figure 4A:
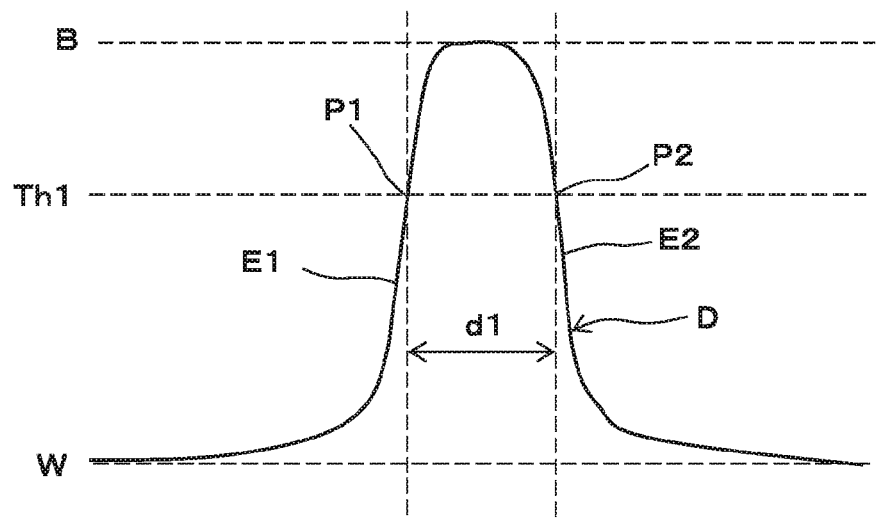
FIG. 4A is a graph showing image data acquired by a detector when the detector reads the check image.
Figure 4B:
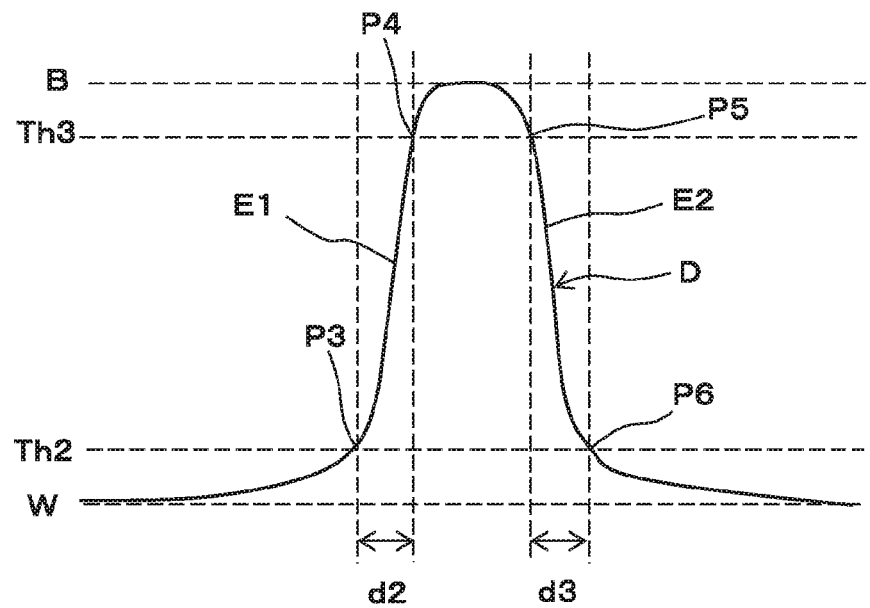
FIG. 4B is a graph showing image data acquired by the detector when the detector reads the check image.

FIGS. 1A and 1B show a first embodiment of image-checking equipment according to the invention showing a configuration example thereof. FIG. 2 shows a configuration example of the first embodiment of the image-checking equipment according to the invention. FIG. 3 shows an example of a check image. FIGS. 4A and 4B show items of image data acquired by a detector when the detector reads the check image. FIG. 5 shows an example of a correction table for correcting the calculated line width of the check image.

A first embodiment of image-checking equipment 1A according to the invention reads a line-shaped check image Pt, shown in FIG. 3, formed on a sheet P that is an example of medium. The image-checking equipment 1A calculates an edge blur of the image data and a line width of the check image. The image-checking equipment 1A then refers to a correction table TB1, shown in FIG. 5, for correcting the calculated line width of the check image with two measured values of the edge blur and the line width of the check image Pt, and acquires a corrected value of the line width based on the correction table TB1 to obtain the accurate line width of the check image Pt based on the edge blur.

The image-checking equipment 1A contains a detector 2A that optically reads the check image Pt shown in FIG. 3 and acquires image data on the check image Pt. The image-checking equipment 1A also contains a transfer device 3A that transfers a sheet P on which the check image Pt has been formed, and a controller 4A that obtains a real line width of the check image Pt and the edge blur indicating the degree to which an edge of the check image Pt is distinct and clear from the image data acquired by the detector 2A. The image-checking equipment 1A further contains a storage device 5A that stores the correction table TB1 and the like.

The detector 2A includes a light-emitting element and a light-receiving element, which are not shown. The light-receiving element receives light which has been emitted from the light-emitting element and has also been reflected by the sheet P. On the sheet P on which an image has been formed, when the image is formed by black ink, there are any different reflection factors in an image-formed position, called as black solid portion and an non-image-formed position, called as white blank paper portion.

The detector 2A optically reads the check image Pt while the transfer device 3A transfers a sheet P on which the line-shaped check image Pt, shown in FIG. 3, has been formed, along a direction that is perpendicular to the check image Pt. The detector 2A also acquires image data D, shown in FIG. 4A, with a signal waveform in which a Hi level of electrical potential is shown at the image-formed position of the check image Pt, namely, the black solid portion B having a small reflection factor and a Low level of electrical potential is shown at a non-image-formed position of the check image Pt, namely, the white blank paper portion W having a large reflection factor. In FIG. 4A, a horizontal axis indicates time course and a vertical axis indicates electrical potential according to the reflection factor.

The transfer device 3A contains transfer rollers 30 including a pair of a driving roller and a driven roller, which nip the sheet P, and a transfer motor 30M driving the driving roller. Alternatively, the sheet P stays and the detector 2A moves so that the detector 2A may be relatively moved in relation to the sheet P, thereby reading the check image Pt.

The controller 4A calculates from the image data D acquired by the detector 2A a line width of the check image Pt and edge blur causing any inaccuracy in the line width. The controller 4A calculates a threshold value Th1 for detection of the line width of the check image Pt from the image data D acquired by the detector 2A in order to acquire the line width of the check image Pt. In this embodiment, the threshold value Th1 is set to be 60% of a peak of the image data D when the electrical potential of the white blank paper portion is 0% and the electrical potential of the black solid portion is 100%. Further, the threshold value Th1 is not limited to this value.

The line width t1 of the check image Pt corresponds to a distance d1 between two points of intersection in which the waveform of the image data D and the threshold value Th1 intersect. The controller 4A calculates a position of one point of intersection P1 in which the waveform of the image data D and the threshold value Th1 intersect. The controller 4A also calculates a position of the other point of intersection P2 in which the waveform of the image data D and the threshold value Th1 intersect. Since the horizontal axis indicates time course in FIG. 4A, by multiplying relative speed of the sheet P and the detector 2A, in this embodiment, transfer speed of the sheet P by a period of time from the point of intersection P1 to the point of intersection P2, the distance d1 from the point of intersection P1 to the point of intersection P2 is acquired. Thus, the line width t1 of the check image Pt corresponding to this distance d1 is calculated.

If a distance between the detector 2A and the sheet P changes from a predetermined reference distance when the detector 2A reads the check image Pt, a rising angle becomes gentle in a rising edge E1 of the waveform of the image data D in which the waveform rises from the Low level of the electrical potential to the Hi level thereof, so that the degree to which the image data is distinct and clear is deteriorated. The same also applies to a falling edge E2 of the waveform of the image data D in which the waveform falls down from the Hi level of the electrical potential to the Low level thereof.

As described above, the line width t1 of the check image Pt is acquired by the distance d1 between two points of intersection in which the waveform of the image data D and the threshold value Th1 intersect. Accordingly, an inclination of each of the rising and falling edges E1 and E2 of the waveform of the image data D causes error in the line width t1 of the check image Pt.

The inclination of the rising edge E1 of the waveform of the image data D is indicated by a distance between two points of intersection in which two threshold values having different values intersect the waveform of the image data D in the rising edge E1. This distance is referred to as "edge blur". The same also applies to the falling edge E2 of the waveform of the image data D.

The controller 4A calculates a lower limit threshold value Th2 and an upper limit threshold value Th3 from the image data D acquired by the detector 2A in order to acquire the edge blur. In this embodiment, as shown in FIG. 4B, the lower limit threshold value Th2 is set to be 10% of the peak of the image data D and the upper limit threshold value Th3 is set to be 90% thereof. However, these threshold values Th2 and Th3 are not limited to these values.

The controller 4A calculates a point of intersection P3 in which the low limit threshold value Th2 intersects the waveform of the image data D in the rising edge E1. The controller 4A also calculates a point of intersection P4 in which the upper limit threshold value Th3 intersects the waveform of the image data D in the rising edge E1. By multiplying the transfer speed of the sheet P by a period of time from the point of intersection P3 to the point of intersection P4, the distance d2 from the point of intersection P3 to the point of intersection P4 is acquired as a value of the edge blur in the rising edge E1.

Further, the controller 4A calculates a point of intersection P5 in which the upper limit threshold value Th3 intersects the waveform of the image data D in the falling edge E2. The controller 4A also calculates a point of intersection P6 in which the lower limit threshold value Th2 intersects the waveform of the image data D in the falling edge E2. By multiplying the transfer speed of the sheet P by a period of time from the point of intersection P5 to the point of intersection P6, the distance d3 from the point of intersection P5 to the point of intersection P6 is acquired as a value of the edge blur in the falling edge E1. In this embodiment, the edge blur d4 of the image data D is set to be an average of the distances d2 and d3 (d4=(d2+d3)/2).

The storage device 5A stores the correction table TB1 for correcting the calculated line width of the check image Pt, shown in FIG. 5. The correction table TB1 is previously prepared on the basis of experimental data. For example, the edge blur d4 and the line width t1 are acquired by reading at least one check image Pt fitting the line width of the check image to be checked with differentiating the distance between the sheet P and the detector 2A. The correction table TB1 is formed by storing measured values of the edge blur and the line width of the check image and a real line width of the check image with correlating to each other. Based on the correction table TB1, the real line width of the check image can be uniquely fixed from a combination of the measured value B1 of the edge blur and the measured value B2 of the line width of the check image.

The controller 4A calculates the edge blur d4 and the line width t1 of the check image Pt from the image data D of the check image Pt and refers to the correction table TB1 with the measured values of the edge blur and the line width of the check image. The controller 4A acquires a corrected line width value based on the correction table TB1 to obtain the real line width t1a of the check image Pt.

<First Operation Example of First Embodiment of Image-Checking Equipment According to Invention>

Figure 6:
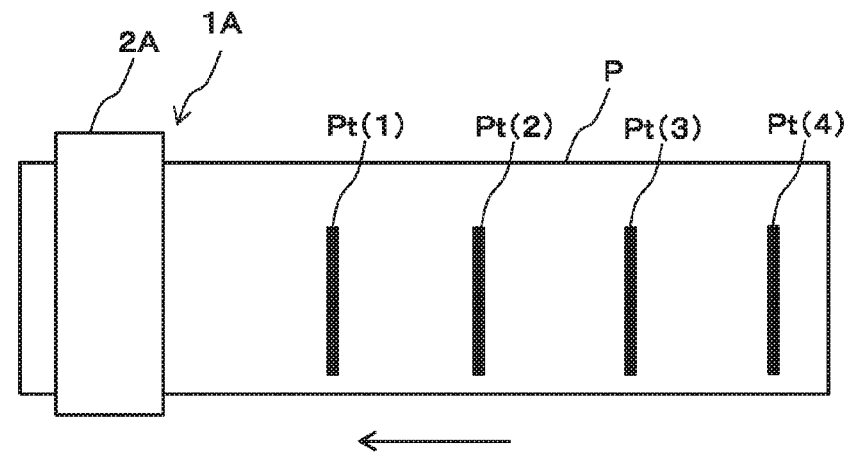
FIG. 6 is a diagram showing an operation example of the first embodiment of the image-checking equipment according to the invention.
Figure 7:
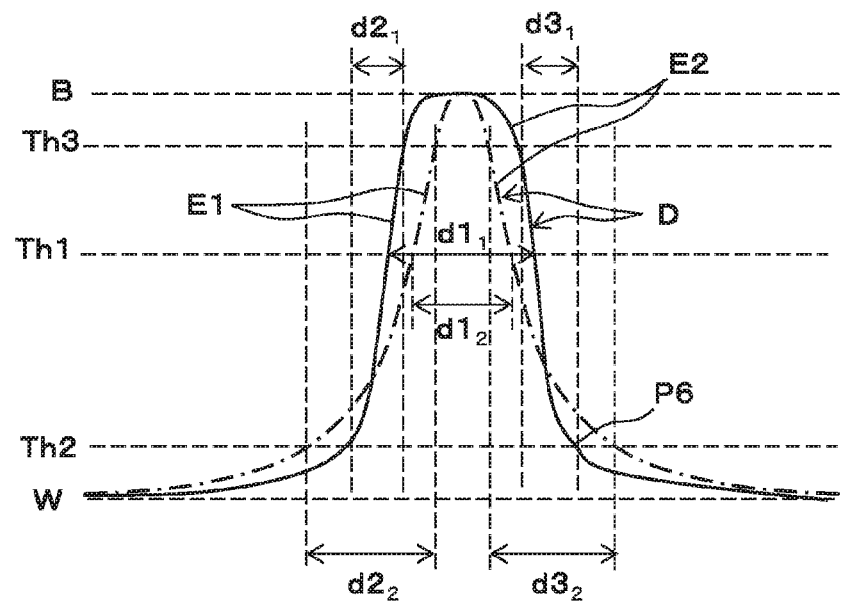
FIG. 7 is a graph showing an example of a relationship between edge blur and line width of the check image.

FIG. 6 shows an operation example of the first embodiment of the image-checking equipment according to the invention. FIG. 7 shows a relationship between the edge blur and the line width of the check image. If the distance between the sheet P and the detector 2A is shifted from the reference distance by any flexion of the sheet P or the like as a case shown by alternate long and short dashes lines in FIG. 1B, a value of edge blur d22 or d32 is increased by comparison of a value of edge blur d21 or d31 which is edge blur when the distance between the sheet P and the detector 2A is the reference distance, as shown in FIG. 7. The same also applies to a calculation result of the average of the edge blur of the rising edge E1 and the edge blur of the falling edge E2.

On the other hand, a value d12 calculated as the line width t1 is decreased by comparison of an accurate value d11 of the line width of the check image Pt. Thus, when changing the distance between the sheet P and the detector 2A, it is difficult to accurately acquire the line width of the check image Pt.

Accordingly, the controller 4A controls the detector 2A to optically read at least one check image Pt having the same line width formed on the sheet P on a sub-scanning direction along a relative moving direction of the sheet P and the detector 2A and acquires the image data D on the check image Pt. The controller 4A then calculates the edge blur d4 from the image data D. The controller 4A further refers to the correction table TB1 with the measured values of the edge blur d4 and the line width t1 of the check image Pt, and acquires a corrected value of the line width based on the correction table TB1 to obtain the accurate line width t1 of the check image Pt.

Moreover, as shown in FIG. 6, the controller 4A controls the detector 2A to optically read plural check images Pt, in this embodiment, four check images Pt(1) through Pt(4) shown in FIG. 5, having the same line width formed on the sheet P on a sub-scanning direction along the relative moving direction of the sheet P and the detector 2A and acquires the image data D on the check images Pt(1) through Pt(4). The controller 4A then calculates the edge blur d4 from each item of the image data D. The controller 4A further refers to the correction table TB1 with the measured values of the edge blur d4 and the line width t1 of each of the check images Pt(1) through Pt(4), and acquires a corrected value of the line width of each of the check images Pt(1) through Pt(4) based on the correction table TB1 to obtain the accurate line width t1 of each of the check images Pt(1) through Pt(4). The controller 4A additionally determines that the accurate line width of the check image can be obtained when the real line width t1 of each of the check images Pt(1) through Pt(4) is the same.

Although the line width of the check image has been obtained using the correction table TB1 for correcting the calculated line width of the check image Pt, a conversion formula can be used which is previously created on the basis of experimental data and can acquire the same result as that of a case using the correction table TB1. In this case, the measured values of the edge blur d4 and the line width t1 of the check image Pt are converted to a value indicating to the real line width of the check image using the conversion formula.

<Configuration Example of First Embodiment of Image-Forming Apparatus According to Invention>

Figure 8:
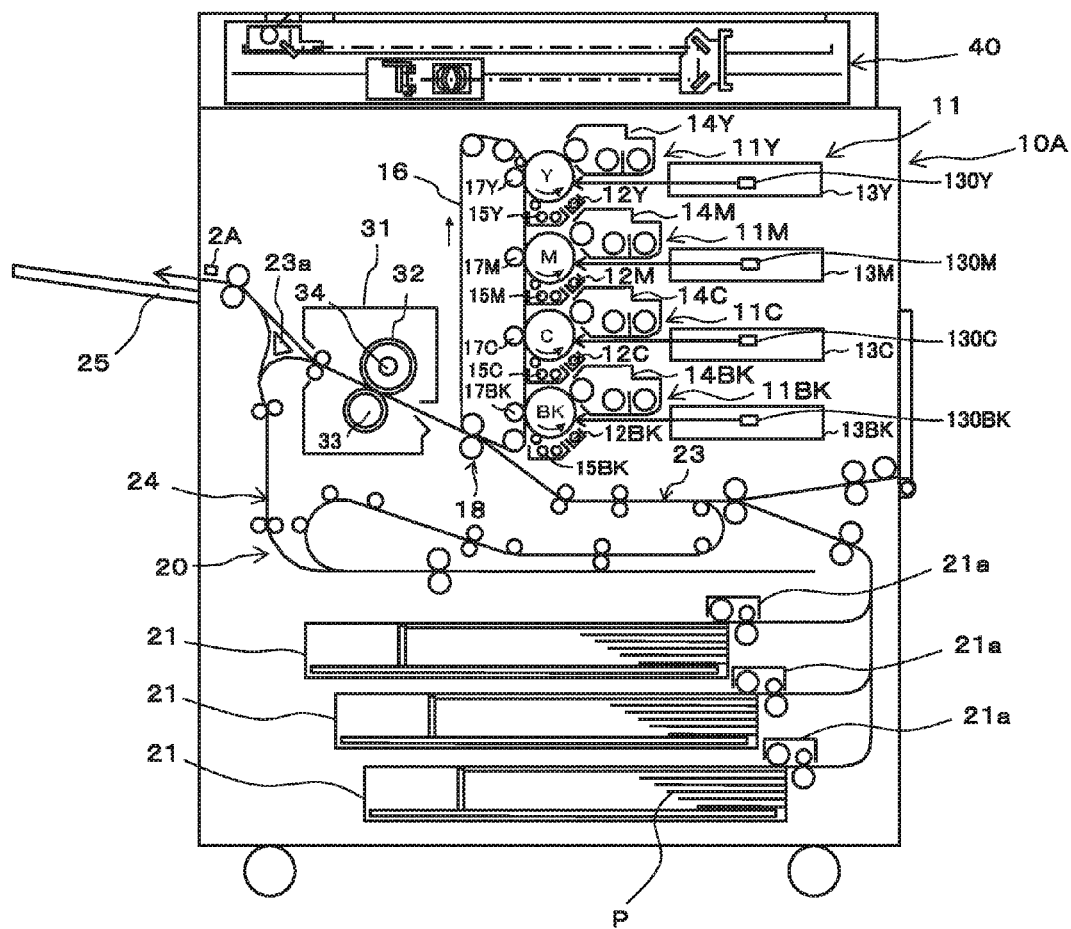
FIG. 8 is a diagram showing a first embodiment of an image-forming apparatus according to the invention showing a configuration example thereof.

FIG. 8 shows a configuration example of a first embodiment of an image-forming apparatus according to the invention. In the first embodiment of the image-forming apparatus 10A, intensity of a laser diode(s) which is (are) wiring means is set on the basis of the line width of the read check image(s) Pt. In this case, it is impossible to correctly set the intensity of the laser diode(s) unless the line width of the read check image(s) Pt is accurately obtained. Thus, by applying the above-mentioned image-checking equipment 1A to the image-forming apparatus 10A, it is possible to accurately acquire the line width of the check image(s).

First, the image-forming apparatus 10A is an electrophotographic image-forming apparatus such as a copier. In this embodiment, the image-forming apparatus 10A is a so-called color image-forming apparatus of a tandem type, in which plural photoreceptors are arranged vertically so as to be opposed to one intermediate transfer belt to form a full color image thereon.

The image-forming apparatus 10A is provided with an image-forming portion 11, a sheet transfer portion 20, a fixing portion 31, the detector 2A and a document-reading device 40.

The image-forming portion 11 includes an image-forming unit 11Y which forms a yellow (Y) image, an image-forming unit 11M which forms a magenta (M) image, an image-forming unit 11C which forms a cyan (C) image and an image-forming unit 11BK which forms a black (BK) image.

The image-forming unit 11Y contains a photosensitive drum Y, a charging portion 12Y positioned around the photosensitive drum Y, an optical writing portion 13Y having a laser diode 130Y, a developing portion 14Y and a drum cleaner 15Y. Similarly, the image-forming unit 11M contains a photosensitive drum M, a charging portion 12M positioned around the photosensitive drum M, an optical writing portion 13M having a laser diode 130M, a developing portion 14M and a drum cleaner 15M. The image-forming unit 11C contains a photosensitive drum C, a charging portion 12C positioned around the photosensitive drum C, an optical writing portion 13C having a laser diode 130C, a developing portion 14C and a drum cleaner 15C. The image-forming unit 11BK contains a photosensitive drum BK, a charging portion 12BK positioned around the photosensitive drum BK, an optical writing portion 13BK having a laser diode 130BK, a developing portion 14BK and a drum cleaner 15BK.

The charging portion 12Y charges a static charge uniformly around the surface of the photosensitive drum Y. The laser diode 130Y of the optical writing portion 13Y scans and exposes a surface of the photosensitive drum Y to form an electrostatic latent image on the photosensitive drum Y. The developing portion 14Y develops the electrostatic latent image formed on the surface of the photosensitive drum Y by using toner. Accordingly, a visible toner image corresponding to yellow is formed on the photosensitive drum Y.

Similarly, the charging portion 12M charges a static charge uniformly around the surface of the photosensitive drum M. The laser diode 130M of the optical writing portion 13M scans and exposes a surface of the photosensitive drum M to form an electrostatic latent image on the photosensitive drum M. The developing portion 14M develops the electrostatic latent image formed on the surface of the photosensitive drum M by using toner. Accordingly, a visible toner image corresponding to the magenta is formed on the photosensitive drum M.

The charging portion 12C charges a static charge uniformly around the surface of the photosensitive drum C. The laser diode 130C of the optical writing portion 13C scans and exposes a surface of the photosensitive drum C to form an electrostatic latent image on the photosensitive drum C. The developing portion 14C develops the electrostatic latent image formed on the surface of the photosensitive drum C by using toner. Accordingly, a visible toner image corresponding to cyan is formed on the photosensitive drum C.

The charging portion 12BK charges a static charge uniformly around the surface of the photosensitive drum BK. The laser diode 130Bk of the optical writing portion 13BK scans and exposes a surface of the photosensitive drum BK to form an electrostatic latent image on the photosensitive drum BK. The developing portion 14BK develops the electrostatic latent image formed on the surface of the photosensitive drum BK by using toner. Accordingly, a visible toner image corresponding to black is formed on the photosensitive drum BK.

Primary transfer rollers 17Y, 17M, 17C and 17BK transfer the images formed on the photosensitive drums Y, M, C and BK one by one onto predetermined positions of an intermediate transfer belt 16 which is a belt-like intermediate transfer member.

Secondary transfer rollers 18 transfer each color image transferred onto the intermediate transfer belt 16 to the sheet P, which is transferred by the sheet transfer portion 20, at a predetermined timing.

The sheet transfer portion 20 includes feeding tray(s), in this embodiment, plural feeding trays 21, containing the sheets P and feeding portions 21a by each of which a sheet P is fed. The sheet transfer portion 20 also includes a main sheet transfer route 23 on which the sheet P fed from any of the feeding trays 21 is transferred, a reverse sheet transfer route 24 in which the sheet P is reversed, and a sheet-ejecting port 25 from which the sheet P is ejected.

The reverse sheet transfer route 24 branches from the main sheet transfer route 23 at a downstream side of the fixing portion 31 in the sheet transfer portion 20. The reverse sheet transfer route 24 includes a change-over gate 23a at a branch portion of the main sheet transfer route 23 and the reverse sheet transfer route 24. The image-forming apparatus 10A forms an image on an upward surface of the sheet P which is transferred to the main sheet transfer route 23, the secondary transfer rollers 18 and the fixing portion 31. When forming images on both surfaces of the sheet P, the sheet P, on an upward surface of which an image has been formed, is transferred from the main sheet transfer route 23 to the reverse sheet transfer route 24. By transferring the sheet P from the reverse sheet transfer route 24 to the main sheet transfer route 23, the other surface of the sheet P to be image-formed faces upward. Thereby, the sheet P is reversed so that the upward other surface of the sheet P can be image-formed.

The fixing portion 31 performs fixing on the sheet P, to which the image has been transferred, to fix the image formed on the sheet P. The fixing portion 31 transfers the sheet P and is provided with a pair of fixing rollers 32 and 33, which are contacted to each other with any pressure, by applying any force to the sheet P to fix the image formed on the sheet P. Further, the fixing portion 31 is provided with a fixing heater 34 that heats the fixing roller 32 and fixes the image formed on the sheet P by heating the sheet P.

The document-reading device 40 scans and exposes an image on the document using an optical system of a scanning and exposing device. The document-reading device 40 reads reflected light by its line image sensor to obtain an image signal. It is to be noted that in the image-forming apparatus 10A, an automatic document feeder, not shown, for automatically feeding the document(s) may be mounted on an upper portion thereof.

The detector 2A is positioned on a position of the main sheet transfer route 23 at a downstream side of the branched portion of the main sheet transfer route 23 and the reverse sheet transfer route 24 and at an upstream side of the sheet-ejecting port 25, in this embodiment, in order to read predetermined check image(s) formed on the sheet P, the image of which has been fixed by the fixing portion 31. The detector 2A may be an inline sensor for detecting any color information and/or any reflection factor information of the check image(s) formed by the image-forming portion 11. The detector 2A may be an optical sensor for detecting any reflection factor information of the check image(s) formed by the image-forming portion 11.

<Control Function Example of First Embodiment of Image-Forming Apparatus According to Invention>

Figure 9:
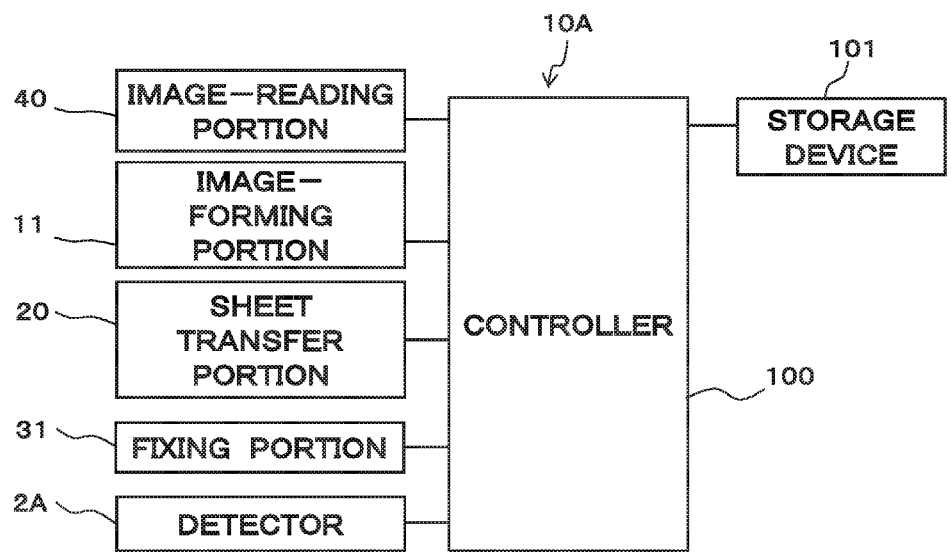
FIG. 9 is a block diagram showing a control function example of the first embodiment of the image-forming apparatus according to the invention.
Figure 10:
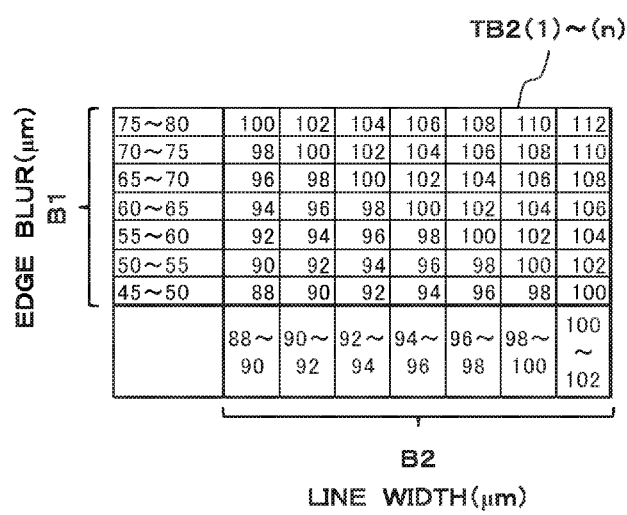
FIG. 10 is a table showing an example of correction tables each for correcting the line width of the check images.

FIG. 9 shows a control function example of the first embodiment of the image-forming apparatus 10A according to the invention. FIG. 10 shows an example of correction tables each for correcting the line width of the check images. The following will describe control function concerning an operation for writing the check images, an operation for reading the check images and acquiring the edge blur and the line width of each of the check images, and an operation for setting intensities of the laser diodes according to the acquired line width of each of the read check images.

The image-forming apparatus 10A includes a controller 100 that controls a series of control operations in the image-forming apparatus 10A from the feeding of the sheet P to the ejection of the sheet P through the image formation. The image-forming apparatus 10A also includes a storage device 101 that stores the correction table for correcting the calculated line width of each of the check images. The controller 100 is provided with a micro processor, such as CPU or MPU and a memory such as RAM and ROM.

An ordinary operation to form an image on the sheet P in the image-forming apparatus 10A will be described. The controller 100 controls the sheet transfer portion 20 to transfer the sheet P. The controller 100 also controls the image-forming portion 11 to form the image on the sheet P based on image data acquired from the document by the document-reading device 40 or image data acquired from outside. The controller 100 further controls the fixing portion 31 to fix the image on the sheet P and to eject the sheet P on which the image is formed.

Figure 11:
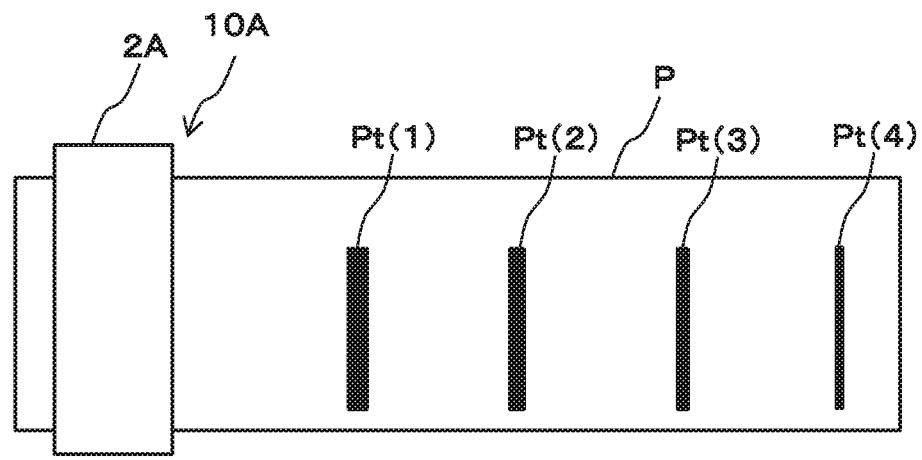
FIG. 11 is an illustration showing an example of check images.

FIG. 11 shows an example of the check images Pt. The controller 100 forms plural check images Pt on the sheet P by changing the intensities of the laser diodes 130Y, 130M, 130C and 130BK in the operation for setting the intensities of the laser diodes 130Y, 130M, 130C and 130BK. In this embodiment, changing the intensities of the laser diodes 130Y, 130M, 130C and 130BK allows the line widths of four check images Pt(1) through Pt(4) to be made different from each other, as shown in FIG. 11.

The storage device 101 stores the correction tables TB2(1) through TB(n) for correcting the calculated line widths of the check images, as shown in FIG. 10. The correction tables TB2(1) through TB(n) are previously prepared on the basis of experimental data. For example, the edge blur d4 and the line width t1 are acquired by reading the check images Pt having different line widths fitting the line widths of the check images to be checked with differentiating the distance between the sheet P and the detector 2A. The correction table TB2(1) through TB(n) are prepared for every line widths of the check images by storing measured values of the edge blur and the line width of each of the check images and a real line width of each of the check images with them correlating to each other.

The line widths of the check images Pt are fixed by the intensities of the laser diodes forming the check images Pt. Therefore, based on the correction tables TB2(1) through TB(n), the real line widths of the check images can be uniquely fixed for every intensities of the laser diodes from a combination of the measured values B1 of the edge blur and the measured values B2 of the line widths of the check images.

The controller 100 transfers the sheet P on which the check images Pt have been formed and fixed to the detector 2A and the detector 2A reads the check images Pt to acquire the image data D. The controller 100 calculates an edge blur of each of the check images Pt and line width thereof from the image data D acquired by the detector 2A. The controller 100 then refers to the correction tables TB2(1) through TB(n) with the measured values of the edge blur d4 and the line width t1 of each of the check images Pt, and acquires a corrected line width value of each of the check images based on the correction table TB2(1) through TB(n) to obtain the real line width t1a of each of the check images Pt. The controller sets the intensities of the laser diodes 130Y, 130M, 130C and 130Bk so that the line width of each of the check images Pt can be desired line widths of the check images Pt.

<First Operation Example of First Embodiment of Image-Forming Apparatus According to the Invention>

Figure 12:
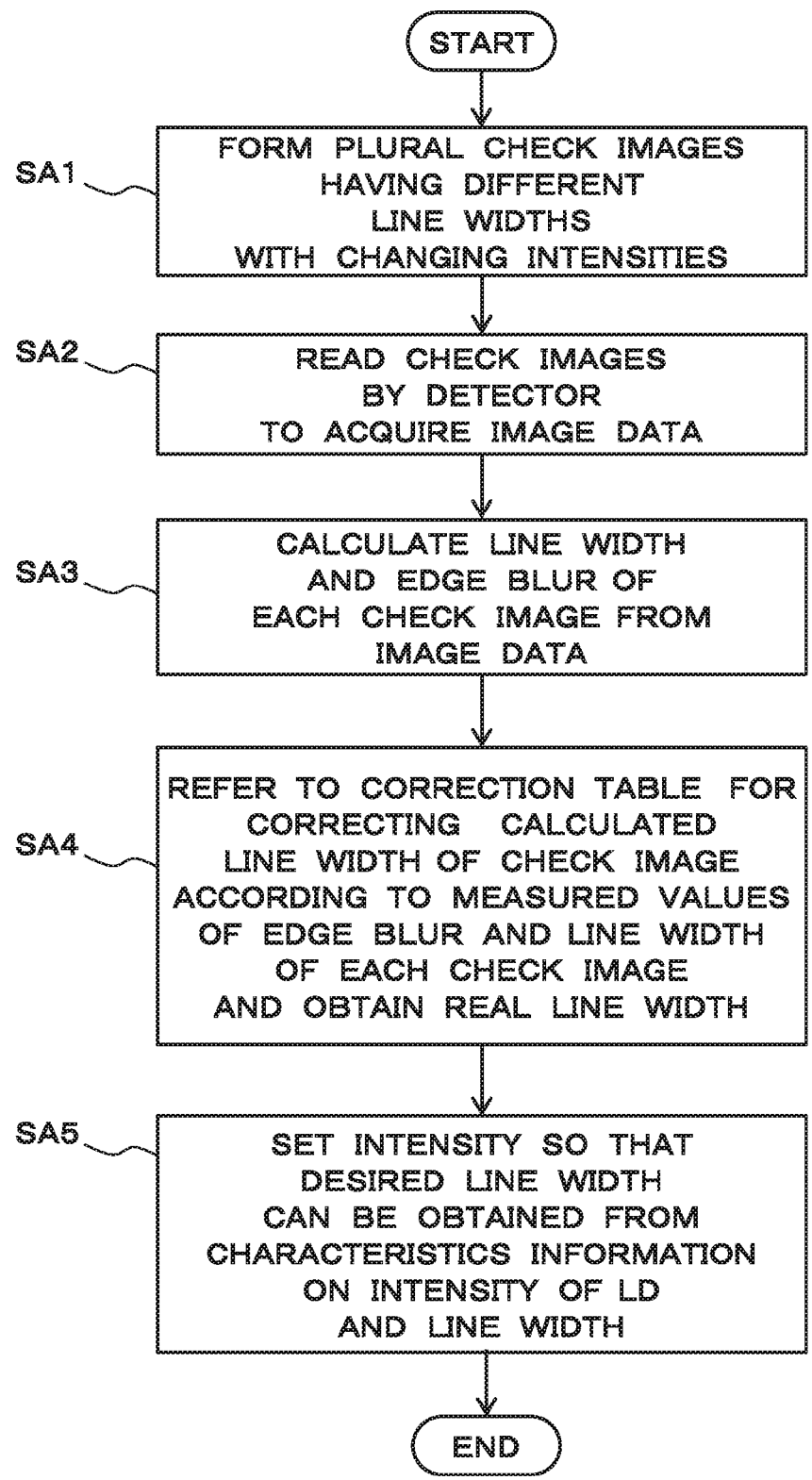
FIG. 12 is a flowchart showing a processing flow in a first operation example of the image-forming apparatus.

FIG. 12 shows a processing flow in a first operation example of the embodiment of the image-forming apparatus 10A according to the invention.

At a step, SA1 of FIG. 12, the controller 100 controls the laser diodes 130Y, 130m, 130C and 130BK to form plural check images Pt on the sheet P with changing their intensities.

In this first operation example, one check image Pt(1) is formed on the sheet P with first intensity L1 and another check image Pt(2) is formed on the sheet P with second intensity L2 which is lower than the first intensity L1. Similarly, a check image Pt(3) is formed on the sheet P with third intensity L3 which is lower than the second intensity L2 and a check image Pt(4) is formed on the sheet P with fourth intensity L4 which is lower than the third intensity L3. In this example, as the intensities of the laser diodes are set to be four levels, the correction tables TB2(1) through TB2(4) for correcting the calculated line width corresponding to four different line widths of the check images may be previously prepared and stored. FIG. 10 shows one correction table corresponding to a certain line width.

At a step, SA2 of FIG. 12, the controller 100 controls the sheet transfer portion 20 to transfer to the detector 2A the sheet P on which the check images Pt(1) through Pt(4) shown in FIG. 11 have been formed and fixed. The detector 2A reads each of the check images Pt(1) through Pt(4) and acquires image data D shown in FIG. 4 for every check image.

At a step, SA3 of FIG. 12, the controller 100 calculates the threshold value Th1 for detection of the line width of the check image Pt for each image data D acquired by the detector 2A. The controller 100 also calculates two points of intersection P1, P2 in which the waveform of the image data D and the threshold value Th1 intersect, as shown in FIG. 4A. The controller 100 multiplies the transfer speed of the sheet P by a period of time from the point of intersection P1 to the point of intersection P2 to calculate the line width of each of the check images Pt(1) through Pt(4).

Further, the controller 100 calculates the lower limit threshold value Th2 and the upper limit threshold value Th3 for each image data D acquired by the detector 2A. The controller 100 also calculates the point of intersection P3 in which the waveform of the image data D and the lower limit threshold value Th2 intersect in the rising edge E1 and the point of intersection P4 in which the waveform of the image data D and the upper limit threshold value Th2 intersect in the rising edge E1, as shown in FIG. 4B. The controller 100 multiplies the transfer speed of the sheet P by a period of time from the point of intersection P3 to the point of intersection P4 to calculate the distance d2 corresponding to the edge blur in the rising edge E1.

Additionally, the controller 100 calculates the point of intersection P5 in which the waveform of the image data D and the upper limit threshold value Th3 intersect in the falling edge E2 and the point of intersection P6 in which the waveform of the image data D and the lower limit threshold value Th2 intersect in the falling edge E2. The controller 100 multiplies the transfer speed of the sheet P by a period of time from the point of intersection P5 to the point of intersection P6 to calculate the distance d3 corresponding to the edge blur in the falling edge E2. In this example, the edge blur of each image data D is set to be average d4 of the distance d2 and the distance d3.

At a step, SA4 of FIG. 12, the controller 100 refers to the correction tables TB2(1) through TB2(4) with the measured values of the edge blur d4 and the line width t1 of the check images Pt(1) through Pt(4), and acquires a corrected line width value based on each of the correction tables TB2(1) through TB2(4) to obtain the real line width t1a of each of the check images Pt(1) through Pt(4).

Figures 13A, 13B:
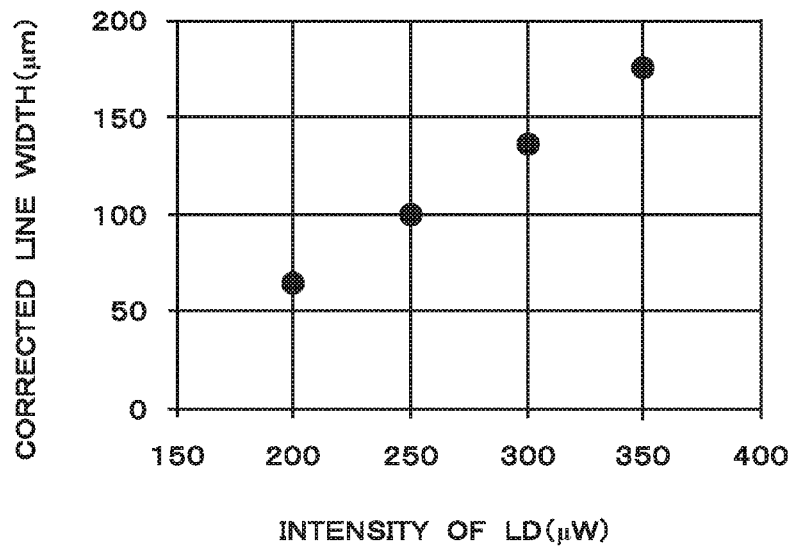
FIG. 13A is a graph showing a relationship between intensity of laser diode and corrected line width of the check image.
FIG. 13B is a table showing a relationship between intensity of the laser diode and line width of the check image.

FIG. 13A shows a relationship between an intensity of laser diode and a line width of the check image. By obtaining the real line width of each of the check images Pt(1) through Pt(4) formed by the laser diodes with changing their intensities, the intensities of the laser diodes which are necessary for forming the images having desired line widths are recognized for each line width and any characteristics information on the intensities of laser diodes and the line widths of the check images as shown in FIGS. 13A and 13B is obtained.

At a step, SA5 of FIG. 12, the controller 100 sets the intensities of laser diodes as to be desired line widths of the check images based on the characteristics information of the intensities of laser diodes and the line widths of the check images as shown in FIGS. 13A and 13B. For example, when a target line width is 150 μm, the intensity of laser diode may be obtained corresponding to this line width of 150 μm from FIGS. 13A and 13B. It is to be noted that although the intensities of the laser diodes have been set so as to be four levels in this example, the intensities of the laser diodes may be set so as to be any plural levels.

When the line widths of the check images Pt cannot be accurately obtained, it may be impossible to set the intensities of the laser diodes so that the line-shaped check images Pt can be too thick or thin, thereby becoming blurred check images and deteriorating quality of the check images.

On the other hand, in the image-forming apparatus 10A, by referring to the correction tables TB2(1) through TB2(4) with the measured values of the edge blur and the line width of the check image, and acquiring the corrected line width values based on the correction tables TB2(1) through TB2(4), it is possible to accurately obtain the real line widths of the check images Pt. Accurately obtaining the real line widths of the check images Pt allows the intensities of the laser diodes which are necessary for forming the images having desired line widths to be recognized, thereby correctly setting the intensities of the laser diodes to make quality of the image forming stabilized.

<Second Operation Example of First Embodiment of Image-Forming Apparatus According to the Invention>

In the image-forming apparatus 10A, the edge blur occurred from the acquired image data D of the read check image changes based on durability of developer which has been used for a long time and/or an environment in which the image-forming apparatus 10A is set.

Figure 14:
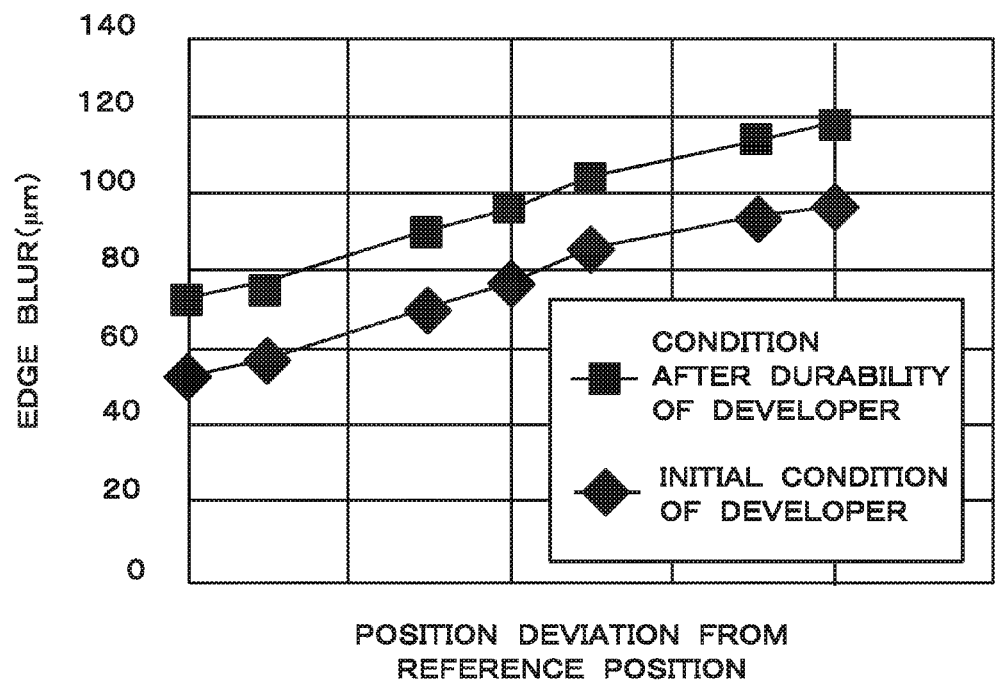
FIG. 14 is a graph showing a variation of the edge blur in relation to durability of developer.

FIG. 14 shows a variation of the edge blur in relation to durability of developer. For example, when the image-forming apparatus 10A is used and any developer is used for a long time, an electric charge amount of toner is degraded and the toner often scatters from the line-shaped check image.

Accordingly, even when any control for forming the same line width of the check image is performed, the waveform of image data D like a waveform thereof indicated by long dashed short dashed lines shown in FIG. 7 is given in a case where the developer is used for a long time while the waveform of image data D like a waveform thereof indicated by a solid line shown in FIG. 7 is given in an initial condition of the developer. This indicates a large edge blur.

Thus, as shown in FIG. 14, when there is a large position deviation from the reference position of the sheet P and detector 2A, the value of edge blur is increased and the value of edge blur after the durability of the developer becomes larger than that in the initial condition of the developer.

Figure 15:
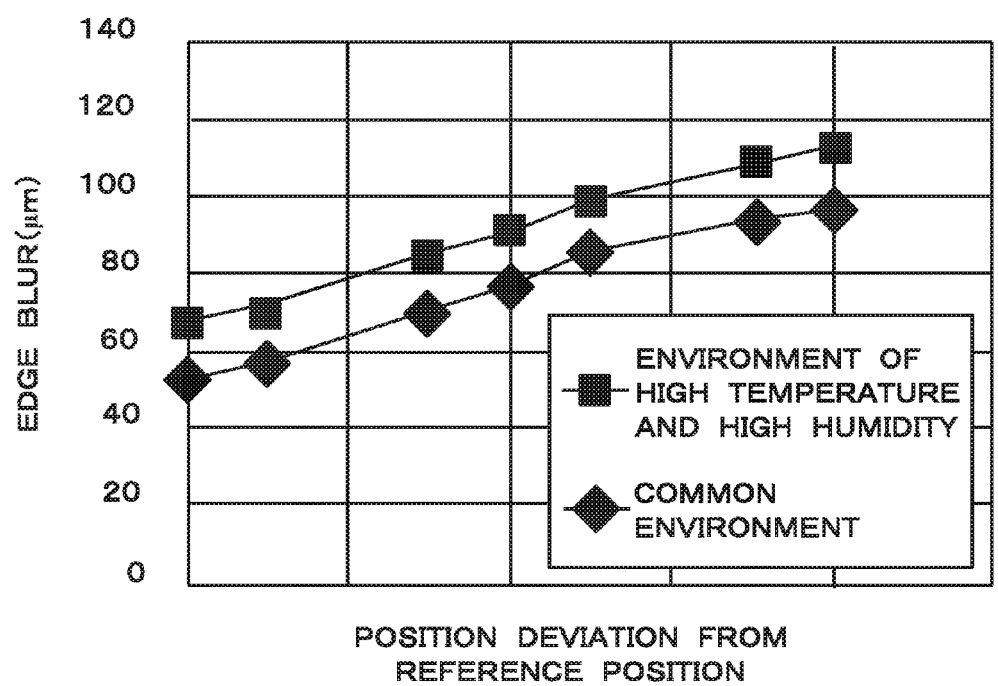
FIG. 15 is a graph showing a variation of the edge blur in relation to an environment.

FIG. 15 shows a variation of the edge blur in relation to an ambient environment. When the image-forming apparatus 10A is settled under an environment of high temperature and high humidity, an electric charge amount of toner is degraded and the toner often scatters from the line-shaped check image.

Accordingly, even when any control for forming the same line width of the check image is performed, the waveform of image data D like a waveform thereof indicated by long dashed short dashed lines shown in FIG. 7 is given under the environment of high temperature and high humidity while the waveform of image data D like a waveform thereof indicated by a solid line shown in FIG. 7 is given under a common environment of middle temperature and middle humidity. This indicates a large edge blur.

Thus, as shown in FIG. 15, when there is a large position deviation from the reference position of the sheet P and detector 2A, the value of edge blur is increased and the value of edge blur under the environment of high temperature and high humidity becomes larger than that under the common environment of middle temperature and middle humidity.

Accordingly, correction tables for correcting the calculated line widths of the check images are prepared by taking into consideration the durability of developer, the ambient environment, and the like. These correction tables can be selected based on the initial condition of the developer, the condition of developer after durability thereof, setting of the ambient environment and the like.

FIGS. 16A and 16B show examples of the correction tables for correcting the line width of the check image, which are selected according to the durability of the developer. The controller 100 of the image-forming apparatus 10A selects the correction table TB3(1) shown in FIG. 16A in the initial condition of the developer. On the other hand, the controller 100 measures a period of used time of the developer and after the durability of the developer when a predetermined period of used time of the developer elapses, the controller 100 selects the correction table TB3(2), shown in FIG. 16B, corresponding to an increase in the value of the edge blur.

After the durability of the developer, the controller 100 controls the detector to read, for example, the check images Pt(1) through Pt(4) shown in FIG. 11 and to acquire the image data D on the check images Pt(1) through Pt(4). The controller 100 also refers to the correction table TB3(2) with the measured values of the edge blur d4 and the line width t1 of each of the check images Pt(1) through Pt(4) acquired from the image data D. The controller 100 then acquires a corrected line width value based on the correction table TB3(2) to obtain the real line width t1a of each of the check images Pt(1) through Pt(4).

This allows the line width of the check image(s) to be accurately obtained even after the durability of the developer. Although the durability of developer has been described, this invention may be applied to any other material in the image-forming apparatus by which the edge blur changes in the initial condition thereof and after the durability thereof.

FIGS. 17A and 17B show examples of the correction tables for correcting the line width of the check image, which are selected according to the ambient environment. The controller 100 of the image-forming apparatus 10A selects the correction table TB4(1) shown in FIG. 17A when selecting a common environment as the settle environment thereof. On the other hand, the controller 100 selects the correction table TB4(2), shown in FIG. 17B, corresponding to an increase in the value of the edge blur when selecting the environment of high temperature and high humidity as the settle environment thereof.

Under the environment of high temperature and high humidity, the controller 100 controls the detector to read, for example, the check images Pt(1) through Pt(4) shown in FIG. 11 and to acquire the image data D on the check images Pt(1) through Pt(4). The controller 100 also refers to the correction table TB4(2) with the measured values of the edge blur d4 and the line width t1 of each of the check images Pt(1) through Pt(4) acquired from the image data D. The controller 100 then acquires a corrected line width value based on the correction table TB4(2) to obtain the real line width t1a of each of the check images Pt(1) through Pt(4). This allows the line width of the check image(s) to be accurately obtained even under the environment of high temperature and high humidity.

The correction tables for correcting the calculated line width of the check image may be prepared by taking into consideration both of the durability and the settle environment. By using any correction coefficients corresponding to the durability and the settle environment, a value obtained from the correction table may be amended. Further, the threshold value Th1 for detection of the line width of the check image, the lower limit threshold value Th2 and the upper limit threshold value Th3 may change based on the durability or the ambient environment, or both of the durability and the ambient environment. The controller 100 may change the thresholds in the initial condition of the developer and the condition after the durability of the developer. The controller 100 may change the thresholds according to setting of the settle environment.

<Second Embodiment of Image-Checking Equipment and Image-Forming Apparatus According to Present Invention>

In a second embodiment of the image-checking equipment and an image-forming apparatus according to the present invention, like components of the second embodiment are like components of the second embodiment. Therefore, they will be omitted in the following description.

A second embodiment of image-checking equipment 1A according to the invention reads a line-shaped check image Pt, shown in FIG. 3, formed on a sheet P that is an example of medium. The image-checking equipment 1A calculates an edge blur of the image data and acquires an accurate value of the line width of the check image Pt based on the edge blur.

The image-checking equipment 1A contains a detector 2A that optically reads the check image Pt shown in FIG. 3 and acquires image data on the check image Pt. The image-checking equipment 1A also contains a transfer device 3A that transfers a sheet P on which the check image Pt has been formed, and a controller 4A that calculates a line width of the check image Pt and the edge blur indicating the degree to which an edge of the check image Pt is distinct and clear from the image data acquired by the detector 2A. The second embodiment of the image-checking equipment 1A, however, does not contain a storage device 5A of the first embodiment of the image-checking equipment 1A.

In the second embodiment of the image-checking equipment and an image-forming apparatus according to the present invention, there is a correlation between the edge blur d4 and the line width t1. When the value of the edge blur d4 is small, the line width t1 becomes close to the original one. Accordingly, the controller 4A calculates the edge blur d4 from the image data D of the check image Pt acquired by the detector 2A and obtains a real line width t1a of the check image Pt according to the image data D in which a value of edge blur d4 is smallest.

<First Operation Example of Second Embodiment of Image-Checking Equipment According to Invention>

The controller 4A controls the detector 2A to optically read plural check images Pt having the same line width formed on the sheet P on the sub-scanning direction along a relative moving direction of the sheet P and the detector 2A and acquires the image data D on the check image Pt. In this embodiment, the plural check images Pt are four check images Pt(1) through Pt(4) as shown in FIG. 6. The controller 4A then calculates the edge blur d4 from each item of the image data D.

FIG. 18 shows a detection result of the edge blur and the line width of the check image. The controller 4A determines as the line width of the check images Pt the line width t1 acquired from the image data in which the value of the edge blur d4 is smallest in the check images Pt(1) through Pt(4) having the same line width acquired by the detector 2A. In a case shown in FIG. 18, the value of the edge blur d4 of the third check image Pt(3) is smallest in the check images Pt(1) through Pt(4). Therefore, the controller 4A determines the line width t1 of the image data acquired from the third check image Pt(3) as the line width of the check images Pt(1) through Pt(4).

Further, since there is the correlation between the edge blur d4 and the line width t1, when the value of the edge blur d4 is small, namely, the distance between the detector 2A and the sheet P becomes close to the reference distance, the line width t1 becomes close to the original one. Accordingly, the controller 4A may determine as the accurate line width of the check images Pt the line width t1 acquired from the image data in which the value of the edge blur d4 is smallest and the line width is widest. Additionally, the controller 4A may determine as the accurate line width of the check images Pt the line width t1 acquired from the image data in which the line width is widest without acquiring the edge blur d4.

However, since an amount of variation in the line width is smaller than an amount of variation in the value of the edge blur in relation to a difference amount of the distance between the detector 2A and the sheet P, it may be difficult to detect the amount of variation in the line width. In this case, it is required to set the threshold value Th1 for detection of the line width of the check image Pt to be made higher. Accordingly, the position by which the line width can be accurately obtained may be acquired using the value of the edge blur or both of the value of the edge blur and the line width.

In this embodiment, at least one check image extending to a main-scanning direction that is a perpendicular to a relatively moving direction of the sheet P and the detector 2A may be formed on the sheet P. The controller 4A controls the detector 2A to read plural positions of the line-shaped check image along the main-scanning direction and acquire image data of each check image, may calculate the edge blur from the image data of each check image acquired by the detector 2A, and may obtain a check image formed position of the sheet P, from which the accurate line width is acquired, on the main-scanning direction.

<Configuration Example of Second Embodiment of Image-Forming Apparatus According to Invention>

A configuration example of the second embodiment of the image-forming apparatus 10A according to the invention is the same as that of the first embodiment of the image-forming apparatus 10A, as shown in FIG. 8. Therefore, the configuration example of the second embodiment of the image-forming apparatus 10A will be omitted.

<Control Function Example of Second Embodiment of Image-Forming Apparatus According to Invention>

A control function example of the second embodiment of the image-forming apparatus 10A according to the invention is the same as that of the first embodiment of the image-forming apparatus 10A, as shown in FIG. 9, except that there is no storage device 101 in the second embodiment of the image-forming apparatus 10A. Therefore, the control function example of the second embodiment of the image-forming apparatus 10A will be omitted.

<First Operation Example of Second Embodiment of Image-Forming Apparatus According to the Invention>

Figure 19:
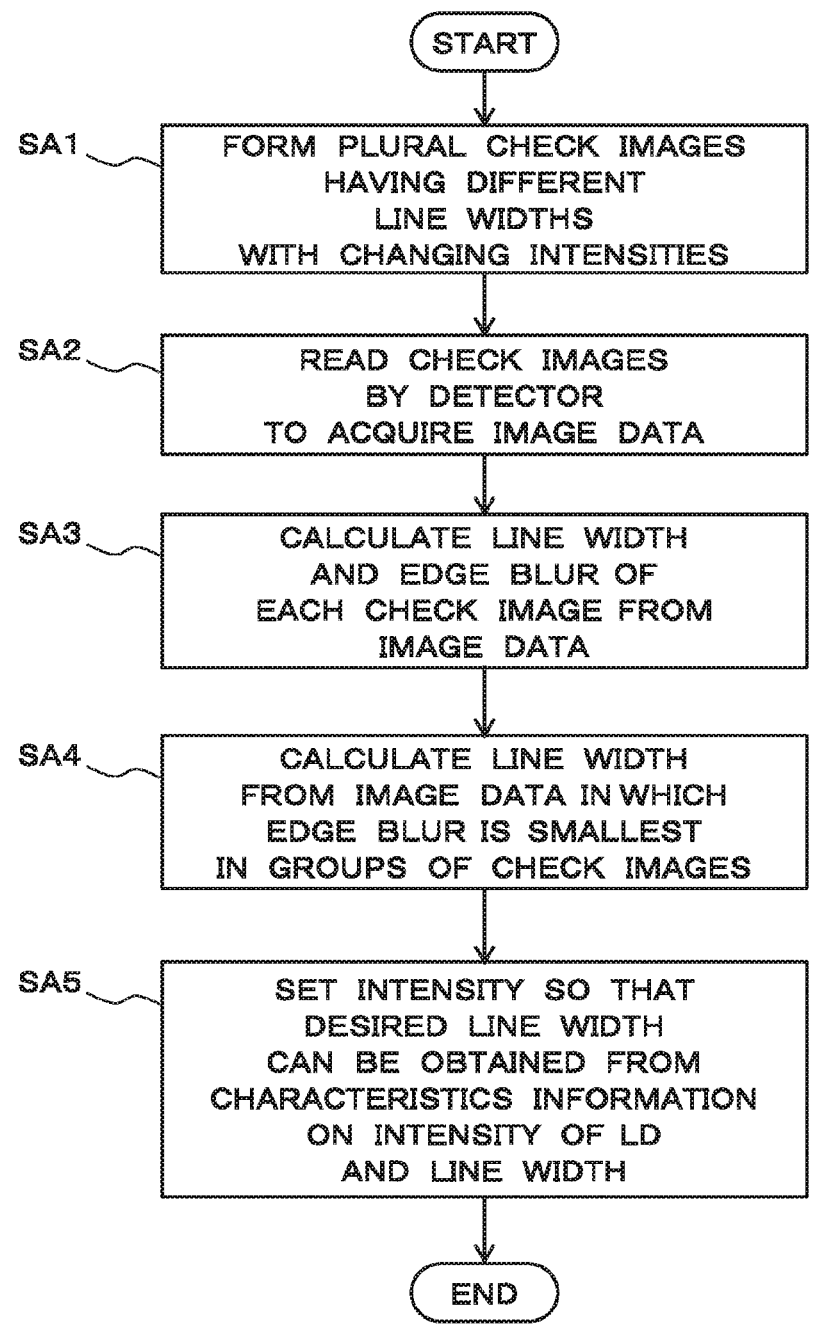
FIG. 19 is a flowchart showing a processing flow in a first operation example of the second embodiment of the image-forming apparatus.
Figures 20, 21:
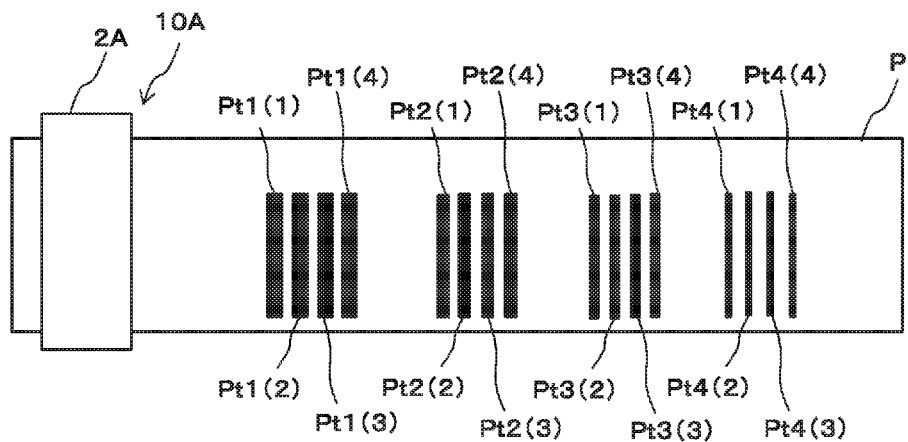
FIG. 20 is a diagram showing an example of the check images in the first operation example of the second embodiment of the image-forming apparatus.
FIG. 21 is a table showing an example of a detection result of the edge blur and the line width of the check image in the first operation example of the second embodiment of the image-forming apparatus.

FIG. 19 shows a processing flow in a first operation example of the second embodiment of the image-forming apparatus 10A according to the invention. FIG. 20 shows an example of the check images in the first operation example of the second embodiment of the image-forming apparatus.

At a step, SA1 of FIG. 19, the controller 100 controls the laser diodes 130Y, 130m, 130C and 130BK to form plural check images Pt on the sheet P with changing their intensities.

In this first operation example, plural check images, in this embodiment, four check images Pt1(1) through Pt1(4), are formed on the sheet P with first intensity L1. Plural check images, in this embodiment, four check images Pt2(1) through Pt2(4), are formed on the sheet P with second intensity L2 which is lower than the first intensity L1. Similarly, plural check images, in this embodiment, four check images Pt3(1) through Pt3(4), are formed on the sheet P with third intensity L3 which is lower than the second intensity L2. Plural check image, in this embodiment, four check images Pt4(1) through Pt4(4), are formed on the sheet P with fourth intensity L4 which is lower than the third intensity L3.

At a step, SA2 of FIG. 19, the controller 100 controls the sheet transfer portion 20 to transfer to the detector 2A the sheet P on which the check images Pt1(1) through Pt1(4), Pt2(1) through Pt2(4), Pt3(1) through Pt3(4), and Pt4(1) through Pt4(4), as shown in FIG. 20, have been formed and fixed. The detector 2A reads each of the check images Pt1(1) through Pt1(4), Pt2(1) through Pt2(4), Pt3(1) through Pt3(4), and Pt4(1) through Pt4(4) and acquires image data D shown in FIG. 4 for every check image.

At a step, SA3 of FIG. 19, the controller 100 calculates the threshold value Th1 for detection of the line width of the check image Pt for each image data D acquired by the detector 2A. The controller 100 also calculates two points of intersection P1, P2 in which the waveform of the image data D and the threshold value Th1 intersect, as shown in FIG. 4A. The controller 100 multiplies the transfer speed of the sheet P by a period of time from the point of intersection P1 to the point of intersection P2 to calculate the line width of each of the check images Pt1(1) through Pt1(4), Pt2(1) through Pt2(4), Pt3(1) through Pt3(4), and Pt4(1) through Pt4(4).

Further, the controller 100 calculates the lower limit threshold value Th2 and the upper limit threshold value Th3 for each image data D acquired by the detector 2A. The controller 100 also calculates the point of intersection P3 in which the waveform of the image data D and the lower limit threshold value Th2 intersect in the rising edge E1 and the point of intersection P4 in which the waveform of the image data D and the upper limit threshold value Th2 intersect in the rising edge E1, as shown in FIG. 4B. The controller 100 multiplies the transfer speed of the sheet P by a period of time from the point of intersection P3 to the point of intersection P4 to calculate the distance d2 corresponding to the edge blur in the rising edge E1.

Additionally, the controller 100 calculates the point of intersection P5 in which the waveform of the image data D and the upper limit threshold value Th3 intersect in the falling edge E2 and the point of intersection P6 in which the waveform of the image data D and the lower limit threshold value Th2 intersect in the falling edge E2. The controller 100 multiplies the transfer speed of the sheet P by a period of time from the point of intersection P5 to the point of intersection P6 to calculate the distance d3 corresponding to the edge blur in the falling edge E2. In this example, the edge blur of each image data D is set to be average d4 of the distance d2 and the distance d3.

FIG. 21 shows an example of a detection result of the edge blur and the line width of the check image in the first operation example of the second embodiment of the image-forming apparatus. At a step, SA4 of FIG. 19, the controller 100 determines as the line width of the check image Pt the line width t1 acquired from the image data in which the edge blur d4 is the smallest for every group of plural check images, in this embodiment, four check images, Pt1(1) through Pt1(4), Pt2(1) through Pt2(4), Pt3(1) through Pt3(4), and Pt4(1) through Pt4(4), formed by predetermined intensities.

Figures 22A, 22B:
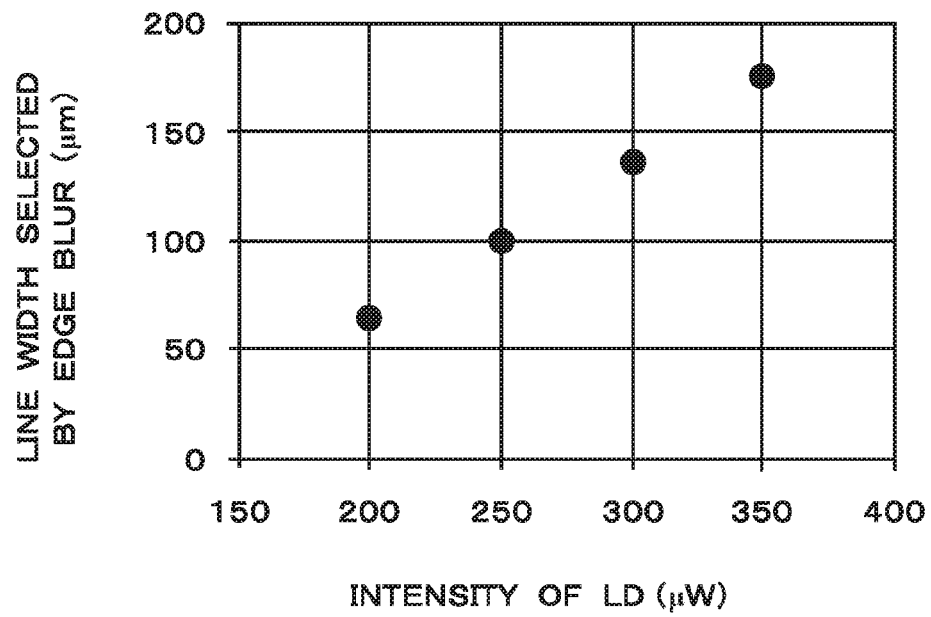
FIG. 22A is a graph showing a relationship between intensity of laser diode and selected line width of the check image.
FIG. 22B is a table showing a relationship between intensity of the laser diode and selected line width of the check image.

FIG. 22A shows a relationship between an intensity of laser diode and line width of the check image. By obtaining the real line width of each of the check images Pt formed by the laser diodes with changing their intensities, the intensities of the laser diodes which are necessary for forming the check images having desired line widths are recognized for each line width and any characteristics information on the intensities of laser diodes and the line widths of the check images as shown in FIGS. 22A and 22B is obtained.

At a step, SA5 of FIG. 19, the controller 100 sets the intensities of laser diodes as to be desired line widths of the check images based on the characteristics information of the intensities of laser diodes and the line widths of the check images as shown in FIGS. 22A and 22B. For example, when a target line width is 150 μm, the intensity of laser diode may be obtained corresponding to this line width of 150 μm from FIGS. 22A and 22B. It is to be noted that although the intensities of the laser diodes have been set so as to be four levels in this example, the intensities of the laser diodes may be set so as to be any plural levels.

When the line widths of the check images Pt cannot be accurately obtained, it may be impossible to set the intensities of the laser diodes so that the line-shaped check images Pt can be too thick or thin, thereby becoming blurred check images and deteriorating quality of the image.

On the other hand, in the image-forming apparatus 10A, by obtaining the line widths of the check images based on the image data D in which the edge blur is the smallest, it is possible to accurately obtain the real line widths of the check images Pt. Accurately obtaining the real line widths of the check images Pt allows the intensities of the laser diodes which are necessary for forming the images having desired line widths to be recognized, thereby correctly setting the intensities of the laser diodes to make quality of the image forming stabilized.

<Second Operation Example of Second Embodiment of Image-Forming Apparatus According to the Invention>

Figure 23A:
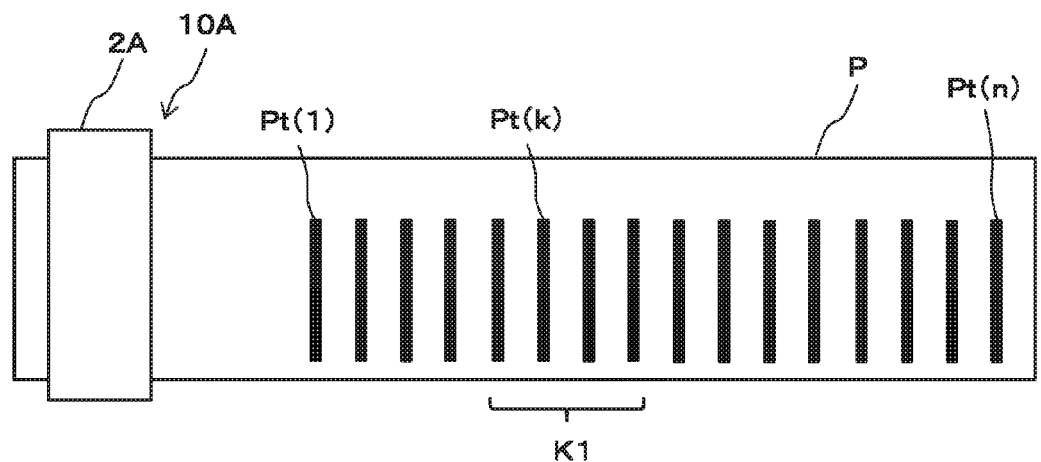
FIG. 23A is a diagram showing an example of the check images in a second operation example of the second embodiment of the image-checking equipment according to the invention.

FIG. 23A shows an example of the check images in the second operation example of the second embodiment of the image-checking equipment according to the invention. In the image-forming apparatus 10A, the rollers and guides constituting the sheet transfer portion 20 are arranged at their fixed positions. The sheet P is transferred by the rollers and the like which are arranged at their fixed positions in the image-forming apparatus 10A so that any portion of the sheet P is fixed in which the distance between the detector 2A and the sheet P is easily changed from the reference distance.

Accordingly, a flexural state of the sheet P transferring on the sheet transfer portion 20 is previously grasped and any portion of the sheet P in which the distance between the detector 2A and the sheet P is hard to be changed from the reference distance is searched.

As described above, by reading the check image(s) Pt formed on the sheet P and acquiring the image data D to obtain the edge blur d4, it is possible to determine that in a portion of the sheet P in which the check image Pt having the smaller value of the edge blur d4 is formed, the distance between the detector 2A and the sheet P is or near the reference distance.

Thus, a portion of the sheet P in which the distance between the detector 2A and the sheet P is hardly changed from the reference distance is determined by utilizing the edge blur d4 of the image data D obtained by reading the check image (s) Pt formed on the sheet P. Other check image (s) Pt is (are) then formed on the portion of the sheet P in which the distance between the detector 2A and the sheet P is hardly changed from the reference distance to obtain the line width of the check image according to the intensities of the laser diodes.

First, the controller 100 controls the image-forming portion 11 forms plural line-shaped check images Pt(1) through Pt(n) having the same line width on whole surface of the sheet P on a transfer direction the sheet P, namely, a sub-scanning direction, by setting the intensities of the laser diodes 130Y, 130M, 130C and 130Bk to be fixed. The controller 100 controls the sheet transfer portion 20 to the sheet P on which the check images Pt(1) through Pt(n) have been formed and fixed to the detector 2A. The detector 2A reads the check images Pt(1) through Pt(n) and acquires the image data D on the check images Pt(1) through Pt(n). The controller 100 calculates the edge blur d4 of each of the check images Pt(1) through Pt(n) from the image data D of each of the check images Pt(1) through Pt(n) acquired by the detector.

The controller 100 then sets a position of the sheet P on which the check image Pt(k) is formed, from which the image data in which a value of the edge blur d4 is smallest is acquired, as a line width detection portion K1. The line width detection portion K1 is a portion of the sheet P, which is transferred by the sheet transfer portion 20, in which the distance between the detector 2A and the sheet P is hard to be changed from the reference distance.

Figure 23B:
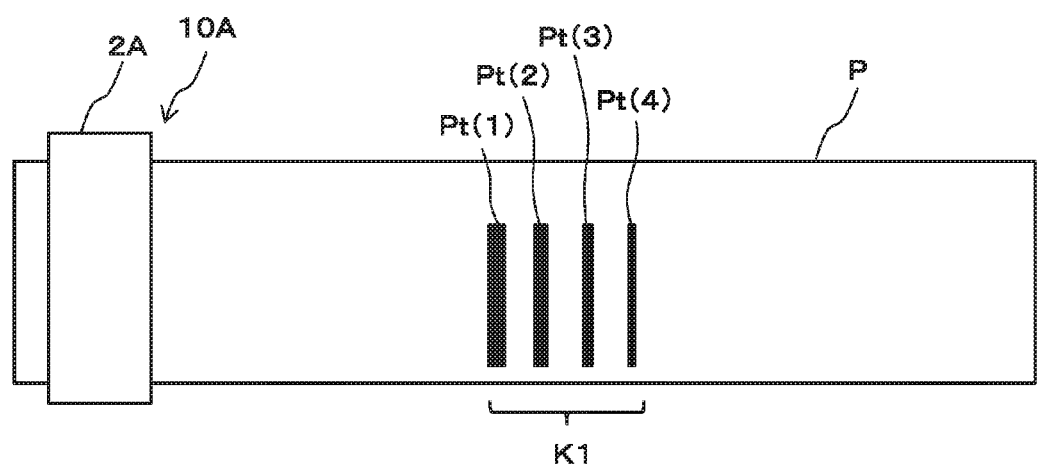
FIG. 23B is a diagram showing an example of the check images having different line widths in the second operation example of the second embodiment of the image-checking equipment according to the invention.

The controller 100 then controls the image-forming portion 11 to form other check images having different line widths from each other, in this embodiment, four check images Pt(1) through Pt(4) on the line width detection portion K1 of the sheet P, as shown in FIG. 23B, with changing the intensities of the laser diodes 130Y, 130M, 130C and 130BK.

The controller 100 controls the sheet transfer portion 20 to the sheet P on which the check images Pt(1) through Pt(4) have been formed and fixed to the detector 2A. The detector 2A reads the check images Pt(1) through Pt(4) and acquires the image data D on the check images Pt(1) through Pt(4). The controller 100 calculates the line widths t1 of the check images Pt(1) through Pt(4) from the image data D of the check images Pt(1) through Pt(4) acquired by the detector 2A.

The controller 100 recognizes the intensities of the laser diodes that are necessary for forming the image with a desired line width for each line width and acquires the characteristics information of the intensities of the laser diodes and the line widths. The controller 100 sets the intensities of the laser diodes so that the line widths of the image become the desired line widths based on the characteristics information of the intensities of the laser diodes and the line widths.

Since the check images Pt(1) through Pt(4) are formed on the line width detection portion K1 of the sheet P in which the distance between the detector 2A and the sheet P is hard to be changed from the reference distance, it is possible to accurately obtain the line width of each of the check images Pt(1) through Pt(4) without performing any determination by the edge blur. This allows the intensities of the laser diodes to be accurately set, thereby making quality of forming the image stable.

<Third Operation Example of Second Embodiment of Image-Forming Apparatus According to the Invention>

Figure 24:
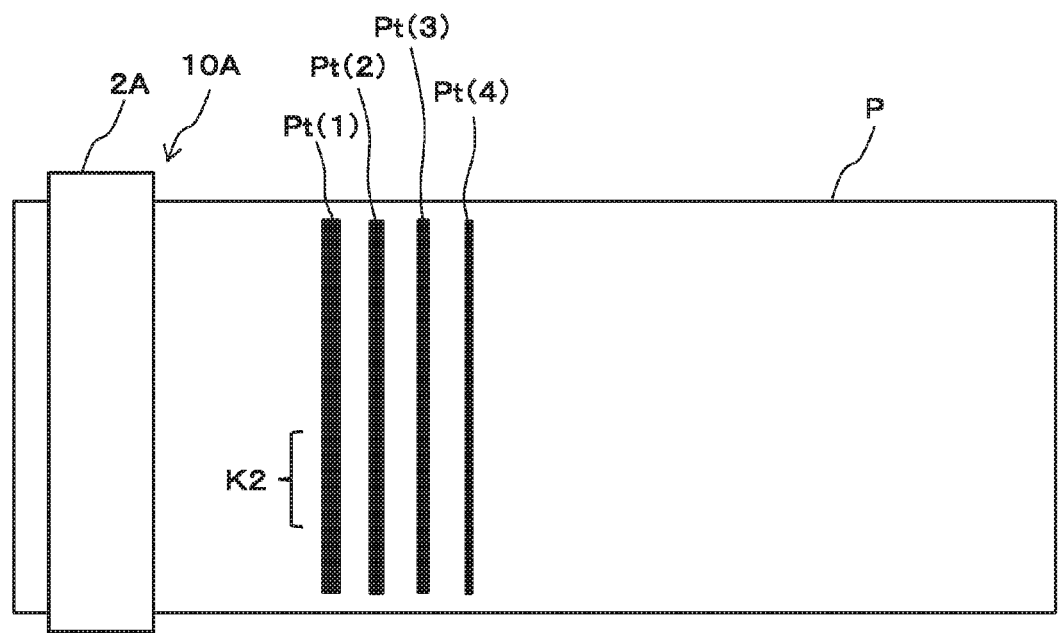
FIG. 24 is a diagram showing an example of the check images in a third operation example in the second embodiment of the image-checking equipment according to the invention.

FIG. 24 shows an example of the check images in a third operation example of the second embodiment of the image-checking equipment according to the invention. A position of the sheet P in which the distance between the detector 2A and the sheet P is hard to be changed from the reference distance has been searched on the sub-scanning direction in the second operation example. On the other hand, a position of the sheet P in which the distance between the detector 2A and the sheet P is hard to be changed from the reference distance is searched on the main-scanning direction in the third operation example.

The controller 100 controls the image-forming portion 11 to form plural check images having different line widths from each other, in this embodiment, four check images Pt(1) through Pt(4) with changing the intensities of the laser diodes 130Y, 130M, 130C and 130BK. The four check images Pt(1) through Pt(4) extend along the main-scanning direction on the sheet P.

The controller 100 controls the sheet transfer portion 20 to the sheet P on which the check images Pt(1) through Pt(4) have been formed and fixed to the detector 2A. The detector 2A reads the check images Pt(1) through Pt(4) and acquires the image data D on plural positions of the check images Pt(1) through Pt(4) along the main-scanning direction. The controller 100 calculates the edge blur d4 of each of the positions of the check images Pt(1) through Pt(4) along the main-scanning direction from the image data D.

The controller 100 then sets a position of the sheet P along the main-scanning direction, from which the image data in which a value of the edge blur d4 is smallest is acquired in each of the check images Pt(1) through Pt(4), as a line width detection portion K2. The line width detection portion K2 is a portion of the sheet P, which is transferred by the sheet transfer portion 20, in which the distance between the detector 2A and the sheet P is hard to be changed from the reference distance.

The controller 100 calculates the line widths t1 of the check images Pt(1) through Pt(4) from the image data D of the check images Pt(1) through Pt(4) acquired on the line width detection portion K2 along the main-scanning direction.

The controller 100 recognizes the intensities of the laser diodes that are necessary for forming the image with a desired line width for each line width and acquires the characteristics information of the intensities of the laser diodes and the line widths. The controller 100 sets the intensities of the laser diodes so that the line widths of the image become the desired line widths based on the characteristics information of the intensities of the laser diodes and the line widths.

Since the check images Pt(1) through Pt(4) are read from the line width detection portion K2 of the sheet P in which the distance between the detector 2A and the sheet P is hard to be changed from the reference distance along the main-scanning direction, it is possible to accurately obtain the line width of each of the check images Pt(1) through Pt(4). This allows the intensities of the laser diodes to be accurately set, thereby making quality of forming the image stable.

<Fourth Operation Example of Second Embodiment of Image-Forming Apparatus According to the Invention>

Figure 25:
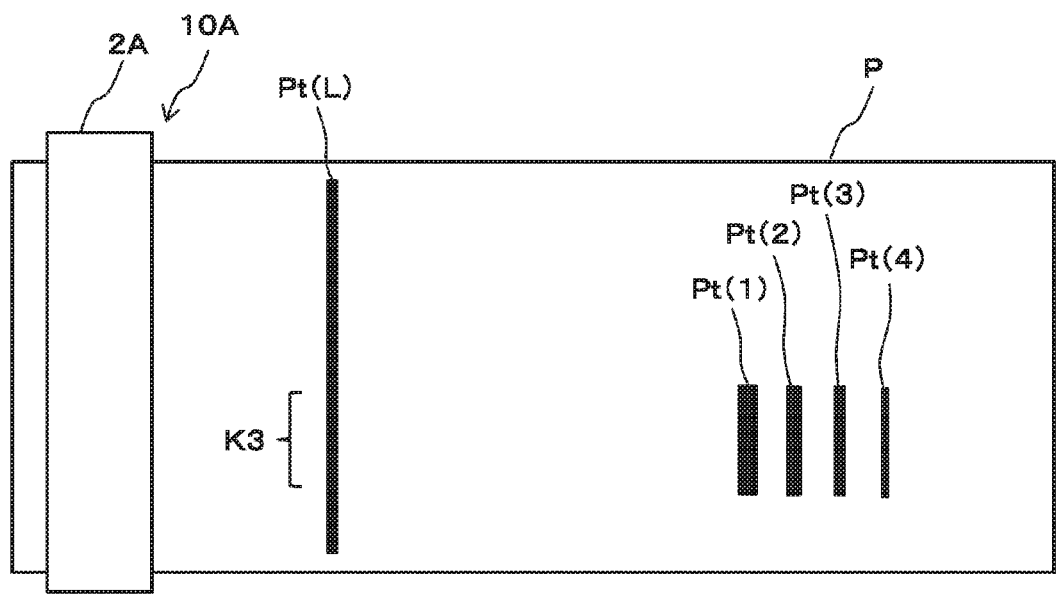
FIG. 25 is a diagram showing an example of the check images in a fourth operation example of the second embodiment of the image-checking equipment according to the invention.

FIG. 25 shows an example of the check images in a fourth operation example of the second embodiment of the image-checking equipment according to the invention. In the fourth operation example, a position of the sheet P in which the distance between the detector 2A and the sheet P is hard to be changed from the reference distance is searched on the main-scanning direction, which is similar to the third operation example.

The controller 100 controls the image-forming portion 11 to form one check image Pt(L) extending along the main-scanning direction on the sheet P with making the intensities of the laser diodes 130Y, 130M, 130C and 130BK constant, as shown in FIG. 25.

The controller 100 controls the sheet transfer portion 20 to the sheet P on which the check image Pt(L) has been formed and fixed to the detector 2A. The detector 2A reads the check image Pt(L) and acquires the image data D on plural positions of the check image Pt(L) along the main-scanning direction. The controller 100 calculates the edge blur d4 of each of the positions of the check image Pt(L) along the main-scanning direction from the image data D.

The controller 100 then sets a position of the sheet P along the main-scanning direction, from which the image data in which a value of the edge blur d4 is smallest is acquired in the check image Pt(L), as a line width detection portion K3. The line width detection portion K3 is a portion of the sheet P, which is transferred by the sheet transfer portion 20, in which the distance between the detector 2A and the sheet P is hard to be changed from the reference distance.

Further, the controller 100 controls the image-forming portion 11 to form plural check images having different line widths from each other, in this embodiment, four check images Pt(1) through Pt(4) on the line width detection portion K3 with changing the intensities of the laser diodes 130Y, 130M, 130C and 130BK. The four check images Pt(1) through Pt(4) extend along the main-scanning direction on the sheet P.

The controller 100 controls the sheet transfer portion 20 to the sheet P on which the check images Pt(1) through Pt(4) have been formed and fixed to the detector 2A. The detector 2A reads the check images Pt(1) through Pt(4) and acquires the image data D on the check images Pt(1) through Pt(4) along the main-scanning direction. The controller 100 then calculates the line widths t1 of the check images Pt(1) through Pt(4) from the image data D of the check images Pt(1) through Pt(4) acquired on the line width detection portion K3 along the main-scanning direction.

The controller 100 recognizes the intensities of the laser diodes that are necessary for forming the image with a desired line width for each line width and acquires the characteristics information of the intensities of the laser diodes and the line widths. The controller 100 sets the intensities of the laser diodes so that the line widths of the image become the desired line widths based on the characteristics information of the intensities of the laser diodes and the line widths.

Since the check images Pt(1) through Pt(4) are formed on the line width detection portion K3 of the sheet P, which is transferred by the sheet transfer portion 20, in which the distance between the detector 2A and the sheet P is hard to be changed from the reference distance, it is possible to accurately obtain the line width of each of the check images Pt(1) through Pt(4). This allows the intensities of the laser diodes to be accurately set, thereby making quality of forming the image stable.

Further, it is possible to search the portion of the sheet P in which the distance between the detector 2A and the sheet P is hard to be changed from the reference distance on the main-scanning direction and the sub-scanning direction by combining the second and third operation examples or the second and fourth operation examples. The line width detection in each of the first through fourth operation examples may be applied to any image checking equipment without having a feedback of the intensity of the laser diode.

<Variations of Second Embodiment of Image-Forming Apparatus According to the Invention>

Figure 26A:
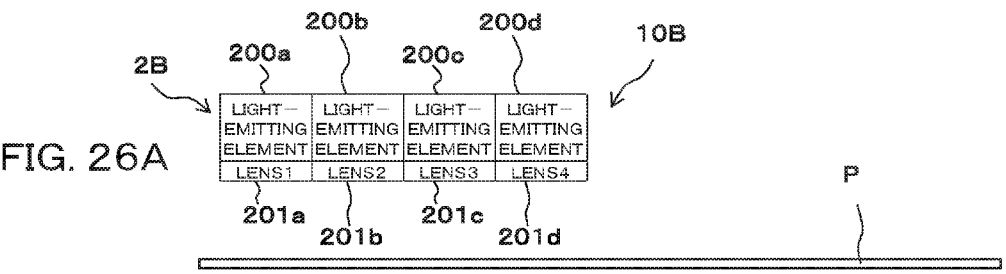
FIGS. 26A through 26D are diagrams each showing variations of the second embodiment of the image-forming apparatus according to the invention.

FIGS. 26A through 26D show variations of the second embodiment of the image-forming apparatus according to the invention. In an image-forming apparatus 10B as shown in FIG. 26A as the variation thereof, a detector 2B contains plural light-emitting elements, in this embodiment, four light-emitting elements 200a through 200d, and light-receiving element (s) for receiving light which is emitted from the light-emitting elements 200a through 200d and reflected by the sheet P, along the transfer direction of the sheet P. The detector 2B also contains plural lenses 201a through 201d having different focal lengths from each other, which correspond to the light-emitting elements 200a through 200d.

Figure 26B:
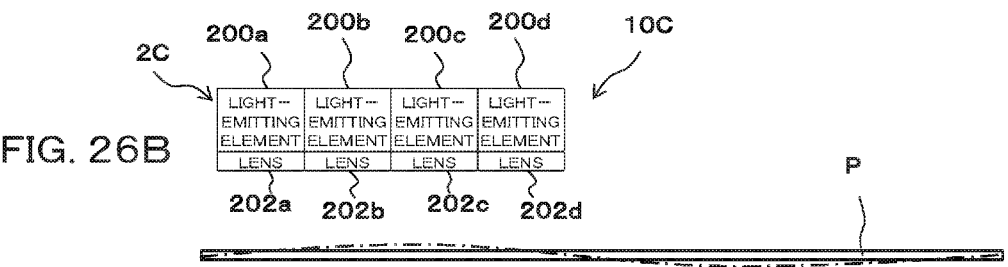
Figure 26C:
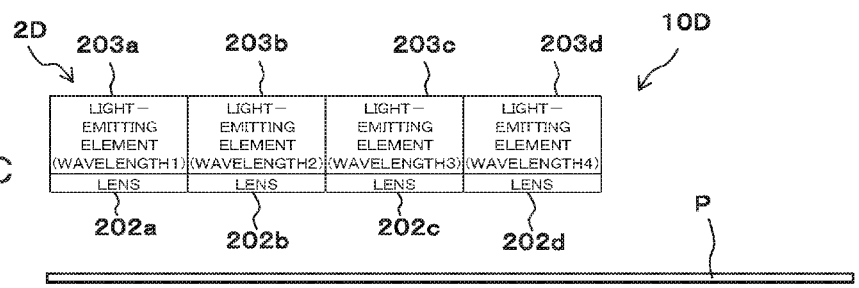
Figure 26D:
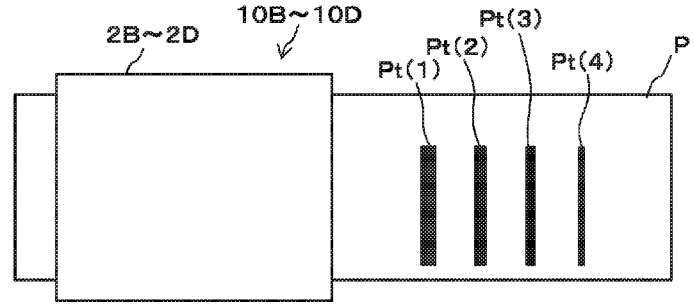

In the image-forming apparatus 10B, for example, the controller 100 controls the image-forming portion 11 to form plural check images, in this embodiment, four check images Pt(1) through Pt(4), having different line widths from each other on the sheet P, as shown in FIG. 26D, with changing the intensities of the laser diodes.

The controller 100 controls the sheet transfer portion 20 to the sheet P on which the check images Pt(1) through Pt(4) have been formed and fixed to the detector 2B. The detector 2B reads the check images Pt(1) through Pt(4) and acquires the image data D on the check images Pt(1) through Pt(4). The controller 100 calculates the edge blur d4 of each of the check images Pt(1) through Pt(4) from the image data D.

The controller 100 calculates the line width t1 of each of the check images Pt(1) through Pt(4) from the image data D acquired by a lens of the plural lenses 201a through 201d in the detector 2B, the image data D being the image data in which a value of the edge blur d4 is smallest and being acquired through the lens of the plural lenses 201a through 201d, because this lens is in focus.

The controller 100 recognizes the intensities of the laser diodes that are necessary for forming the image with a desired line width for each line width and acquires the characteristics information of the intensities of the laser diodes and the line widths. The controller 100 sets the intensities of the laser diodes so that the line widths of the image become the desired line widths based on the characteristics information of the intensities of the laser diodes and the line widths.

Since the line width of check images can be obtained by selecting the lens which is in focus among the lenses having different focal lengths from each other in the image-forming apparatus 10B, it is possible to accurately obtain the line width of each of the check images Pt(1) through Pt(4). This allows the intensities of the laser diodes to be accurately set, thereby making quality of forming the image stable.

In an image-forming apparatus 10C as shown in FIG. 26B as the variation thereof, a detector 2C contains plural light-emitting elements, in this embodiment, four light-emitting elements 200a through 200d, and light-receiving element(s) for receiving light which is emitted from the light-emitting elements 200a through 200d and reflected by the sheet P, along the transfer direction of the sheet P. The detector 2C also contains plural lenses 202a through 202d having the same focal lengths, which correspond to the light-emitting elements 200a through 200d.

In the image-forming apparatus 10C, for example, the controller 100 controls the image-forming portion 11 to form plural check images, in this embodiment, four check images Pt(1) through Pt(4), having different line widths from each other on the sheet P, as shown in FIG. 26D, with changing the intensities of the laser diodes.

The controller 100 controls the sheet transfer portion 20 to the sheet P on which the check images Pt(1) through Pt(4) have been formed and fixed to the detector 2C. The detector 2C reads the check images Pt(1) through Pt(4) and acquires the image data D on the check images Pt(1) through Pt(4). The controller 100 calculates the edge blur d4 of each of the check images Pt(1) through Pt(4) from the image data D.

The controller 100 calculates the line width t1 of each of the check images Pt(1) through Pt(4) from the image data D acquired by a lens of the plural lenses 202a through 202d in the detector 2C, the image data D being the image data in which a value of the edge blur d4 is smallest and being acquired through the lens of the plural lenses 202a through 202d, because this lens is in focus.

The controller 100 recognizes the intensities of the laser diodes that are necessary for forming the image with a desired line width for each line width and acquires the characteristics information of the intensities of the laser diodes and the line widths. The controller 100 sets the intensities of the laser diodes so that the line widths of the image become the desired line widths based on the characteristics information of the intensities of the laser diodes and the line widths.

Since the line width of check images can be obtained by selecting the lens which is in focus among the lenses having different focal lengths from each other in the image-forming apparatus 10C, it is possible to accurately obtain the line width of each of the check images Pt(1) through Pt(4) by selecting the image data D in a position of the sheet in which the distance between the sheet P and the detector 2C is the reference distance. This allows the intensities of the laser diodes to be accurately set, thereby making quality of forming the image stable.

In an image-forming apparatus 10D as shown in FIG. 26C as the variation thereof, a detector 2D contains plural light-emitting elements, in this embodiment, four light-emitting elements 203a through 203d, emitting light having different wave lengths and light-receiving element(s) for receiving light which is emitted from the light-emitting elements 203a through 203d and reflected by the sheet P, along the transfer direction of the sheet P. The detector 2D also contains plural lenses 202a through 202d having the same focal lengths, which correspond to the light-emitting elements 203a through 203d.

In the image-forming apparatus 10D, for example, the controller 100 controls the image-forming portion 11 to form plural check images, in this embodiment, four check images Pt(1) through Pt(4), having different line widths from each other on the sheet P, as shown in FIG. 26D, with changing the intensities of the laser diodes.

The controller 100 controls the sheet transfer portion 20 to the sheet P on which the check images Pt(1) through Pt(4) have been formed and fixed to the detector 2D. The detector 2D reads the check images Pt(1) through Pt(4) and acquires the image data D on the check images Pt(1) through Pt(4). The controller 100 calculates the edge blur d4 of each of the check images Pt(1) through Pt(4) from the image data D.

The controller 100 calculates the line width t1 of each of the check images Pt(1) through Pt(4) from the image data D acquired by light from a light-emitting element of the plural light-emitting elements 203a through 203d in the detector 2D, the image data D being the image data in which a value of the edge blur d4 is smallest and being acquired by receiving the light from the light-emitting element of the plural light-emitting elements 203a through 203d, because this light-emitting element has consistent wave length.

The controller 100 recognizes the intensities of the laser diodes that are necessary for forming the image with a desired line width for each line width and acquires the characteristics information of the intensities of the laser diodes and the line widths. The controller 100 sets the intensities of the laser diodes so that the line widths of the image become the desired line widths based on the characteristics information of the intensities of the laser diodes and the line widths.

Since the line width of check images can be obtained by selecting the light-emitting element which has consistent wave length among the plural light-emitting elements emitting light having different wave lengths in the image-forming apparatus 10D, it is possible to accurately obtain the line width of each of the check images Pt(1) through Pt(4). This allows the intensities of the laser diodes to be accurately set, thereby making quality of forming the image stable.

Although the image-forming apparatus 10B trough 10D has contained a configuration such that a plural light-emitting elements and plural lenses are arranged along the sheet-transfer direction, namely, the sub-scanning direction, they may be arranged along the main-scanning direction. Further, they may be arranged along both of the main-scanning direction and the sub-scanning direction.

The line width detection in each of the image-forming apparatuses 10B through 10D may be applied to any image checking equipment without having a feedback of the intensity of the laser diode.

Although the check image(s) has (have) been formed on a sheet in the above-mentioned embodiments, it (they) may be formed on any other medium such as resin. This medium may be paper-like or thick. When there are any uneven portions on a surface of the medium, a distance between the medium and the detector changes so that it may be impossible to accurately obtain the line width of the check image(e). In this case, by applying the above-mentioned invention thereto, it may be possible to accurately obtain the line width of the check image(e).

This invention is applicable to an image-forming apparatus which obtains the line width of the check image(s) formed by a predetermined image writing output and sets image writing output according to the obtained line width.

The terms and expressions which have been employed in the foregoing description are used therein as terms of description and not of limitation, and these are no intention, in the use of such terms and expressions, of excluding equivalent of the features shown and described or portions thereof, it being recognized that the scope of the invention is defined and limited only by the claims.

What is claimed is:

1. Image-checking equipment comprising:
    a detector that optically reads a line-shaped check image formed on medium and acquires image data on the check image; and
    a controller that calculates an edge blur in a rising edge and a falling edge of the image data acquired by the detector, calculates a line width of the check image and obtains a real line width of the check image according to calculated values of the edge blur and the line width of the check image;
    wherein based on the detection result of the line width of the check image, the controller sets output from the image-forming portion that forms the image with the resulted line width.

2. The image-checking equipment according to claim 1 wherein a correction table for correcting the calculated line width of the check image is stored, and the real line width of the check image correlates to the edge blur and a calculated value of the line width of the check image in the correction table, and
    the controller refers to the correction table with the calculated values of the edge blur and the line width of the check image, and acquires a corrected line width value based on the correction table to obtain the real line width of the check image.

3. An image-forming apparatus comprising:
    an image-forming portion that forms an image on medium and forms a line-shaped check image on the medium;
    a detector that optically reads the check image formed on the medium and acquires image data on the check image; and
    a controller that calculates an edge blur in a rising edge and a falling edge of the image data acquired by the detector on the line-shaped check image formed on the medium by the image-forming portion, calculates a line width of the check image and obtains a real line width of the check image according to calculated values of the edge blur and the line width of the check image;
    wherein based on the detection result of the line width of the check image, the controller sets output from the image-forming portion that forms the image with the resulted line width.

4. The image-forming apparatus according to claim 3 wherein a correction table for correcting the calculated line width of the check image is stored, and the real line width of the check image correlates to the edge blur and a calculated value of the line width of the check image in the correction table, and
    the controller refers to the correction table with the calculated values of the edge blur and the line width of the check image, and acquires a corrected line width value based on the correction table to obtain the real line width of the check image.

5. The image-forming apparatus according to claim 4 wherein plural correction tables for correcting the calculated line width of the check image are stored, each table corresponding to edge blurs changed according to durability, and
    the controller selects any one of the correction tables according to the durability.

6. The image-forming apparatus according to claim 4 wherein plural correction tables for correcting the calculated line width of the check image are stored, each table corresponding to edge blurs changed according to an ambient environment, and
    the controller selects any one of the correction tables according to the ambient environment.

7. The image-forming apparatus according to claim 3 wherein the controller changes a line-width detection threshold value to obtain the line width of the check image, and upper and lower limit threshold values to obtain the edge blur based on durability, an ambient environment or both of the durability and the ambient environment from the image data acquired by the detector on the line-shaped check image formed on the medium by the image-forming portion.

8. The image-forming apparatus according to claim 3 wherein the detector is an in-line sensor that detects color information and reflectivity information of the check image formed by the image-forming portion.

9. The image-forming apparatus according to claim 3 wherein the detector is an optical sensor that detects reflectivity information of the check image formed by the image-forming portion.

10. Image-checking equipment comprising:
    a detector that optically reads a line-shaped check image formed on medium and acquires image data on the check image; and
    a controller that calculates an edge blur in a rising edge and a falling edge of the image data acquired by the detector, calculates a line width of the check image and obtains a real line width of the check image according to the image data in which a value of the edge blur is smallest, the image data in which the line width is widest or the image data in which a value of the edge blur is smallest and the line width is widest;
    wherein based on the detection result of the line width of the check image, the controller sets output from the image-forming portion that forms the image with resulted line width.

11. The image-checking equipment according to claim 10 wherein plural line-shaped check images are formed on the medium on a sub-scanning direction that extends along a relatively moving direction of the medium and the detector, and
    the controller calculates the edge blur from the image data of each of the check images acquired by the detector, calculates the line width of each of the check images and obtains the real line width of each of the check images according to the image data in which a value of the edge blur is smallest, the image data in which the line width is widest or the image data in which a value of the edge blur is smallest and the line width is widest.

12. The image-checking equipment according to claim 10 wherein at least one check image extending to a main-scanning direction that is a perpendicular to a relatively moving direction of the medium and the detector is formed on the medium, and the controller calculates the edge blur from the image data acquired by the detector, calculates the line width of each check image and obtains the real line width of the check image according to the image data in which a value of the edge blur is smallest, the image data in which the line width is widest or the image data in which a value of the edge blur is smallest and the line width is widest.

13. An image-forming apparatus comprising:
    an image-forming portion that forms an image on medium and forms a line-shaped check image on the medium;
    a detector that optically reads the line-shaped check image formed on the medium by the image-forming portion and acquires image data on the line-shaped check image; and a controller that calculates edge blur in a rising edge and a falling edge of the image data acquired by the detector, calculates a line width of the check image and obtains a real line width of the check image according to the image data in which a value of edge blur is smallest, the image data in which line width is widest or the image data in which a value of the edge blur is smallest and the line width is widest;

wherein based on the detection result of the line width of the check image, the controller sets output from the image-forming portion that forms the image with the resulted line width.

14. The image-forming apparatus according to claim 13 wherein the image-forming portion forms plural line-shaped check images on the medium on a sub-scanning direction that extends along a relatively moving direction of the medium and the detector, and the controller calculates the edge blur from the image data of each of the check images acquired by the detector, calculates the line width of each of the check images and calculates the real line width of each of the check images according to the image data in which a value of the edge blur is smallest, the image data in which the line width is widest or the image data in which a value of the edge blur is smallest and the line width is widest.

15. The image-forming apparatus according to claim 14 wherein the controller calculates the edge blur from the image data of each of the check images acquired by the detector, sets a check image formed position of the medium, from which the image data in which a value of the edge blur is smallest is acquired, as a line width detection portion, controls the image-forming portion to form check images having different line widths from each other on the line width detection portion with changing image-writing power, and calculates a line width of each of the check images having the different line widths according to the image-writing power from the image data of each of the check images having the different line widths acquired by the detector.

16. The image-forming apparatus according to claim 13 wherein the image-forming portion forms at least one line-shaped check image on the medium, said at least one line-shaped check image extending to a main-scanning direction which is perpendicular to a relatively moving direction of the medium and the detector, and the controller controls the detector to read plural positions of said at least one line-shaped check image along the main-scanning direction and acquire image data of each check image, calculates the edge blur from the image data of each check image acquired by the detector, calculates the line width of each check image and calculates the real line width of each check image according to the image data in which a value of the edge blur is smallest, the image data in which the line width is widest or the image data in which a value of the edge blur is smallest and the line width is widest.

17. The image-forming apparatus according to claim 16 wherein the controller controls the detector to read plural positions of said at least one line-shaped check image along the main-scanning direction and acquire image data of each check image, calculates the edge blur from the image data of each check image acquired by the detector, sets a check image formed position of the medium, from which the image data in which a value of the edge blur is smallest is acquired, as a line width detection portion, controls the image-forming portion to form check images having different line widths from each other on the line width detection portion with changing image-writing power, and calculates a line width of each of the check images having the different line widths according to the image-writing power from the image data of each of the check images having the different line widths acquired by the detector.

18. The image-forming apparatus according to claim 13 wherein the detector contains plural light-emitting elements and plural lenses which have different focal lengths from each other, on at least the sub-scanning direction that extends along a relatively moving direction of the medium and the detector, and the controller calculates the edge blur from the image data acquired by the detector, and calculates the real line width of check image from the image data acquired by a lens of the plural lenses in the detector, the image data being the image data in which a value of the edge blur is smallest and being acquired through the lens of the plural lenses.

19. The image-forming apparatus according to claim 13 wherein the detector contains plural light-emitting elements and plural lenses which have the same focal length, on at least the sub-scanning direction along a relatively moving direction of the medium and the detector, and the controller calculates the edge blur from the image data acquired by the detector, and calculates the real line width of check image from the image data acquired by a lens of the plural lenses in the detector, the image data being the image data in which a value of the edge blur is smallest and being acquired through the lens of the plural lenses.

20. The image-forming apparatus according to claim 13 wherein the detector contains plural light-emitting elements which emit light having different wavelengths from each other and plural lenses which have the same focal length, on at least the sub-scanning direction along a relatively moving direction of the medium and the detector, and the controller calculates the edge blur from the image data acquired by the detector, and calculates the real line width of check image from the image data acquired by one of the plural light-emitting elements in the detector, the image data being the image data in which a value of the edge blur is smallest and being acquired by receiving the light emitted by said one of the light-emitting elements.

21. The image-forming apparatus according to claim 13 wherein the detector is an in-line sensor that detects color information and reflectivity information of the check image formed by the image-forming portion.

22. The image-forming apparatus according to claim 13 wherein the detector is an optical sensor that detects reflectivity information of the check image formed by the image-forming portion.

* * * * *